(12) United States Patent
Cheng et al.

(10) Patent No.: US 11,888,765 B2
(45) Date of Patent: Jan. 30, 2024

(54) METHODS AND APPARATUS FOR WIRELESS COMMUNICATIONS OVER SUBSETS OF CONTIGUOUS SUBCARRIERS

(71) Applicant: Futurewei Technologies, Inc., Plano, TX (US)

(72) Inventors: Qian Cheng, Naperville, IL (US); Weimin Xiao, Hoffman Estates, IL (US); Philippe Sartori, Plainfield, IL (US); Jialing Liu, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 17/101,974

(22) Filed: Nov. 23, 2020

(65) Prior Publication Data
US 2021/0075563 A1 Mar. 11, 2021

Related U.S. Application Data

(63) Continuation of application No. 16/183,527, filed on Nov. 7, 2018, now Pat. No. 10,848,278, which is a
(Continued)

(51) Int. Cl.
*H04L 5/00* (2006.01)
*H04L 25/00* (2006.01)
*H04W 72/23* (2023.01)

(52) U.S. Cl.
CPC ............ *H04L 5/001* (2013.01); *H04L 5/0037* (2013.01); *H04L 5/0044* (2013.01); *H04L 25/00* (2013.01); *H04W 72/23* (2023.01); *H04L 5/0053* (2013.01)

(58) Field of Classification Search
CPC ....... H04L 5/001; H04L 25/00; H04L 5/0037; H04L 5/0044; H04L 5/0053; H04W 72/14
See application file for complete search history.

(56) References Cited

U.S. PATENT DOCUMENTS 7,657,337 B1 2/2010 Evans et al.
8,074,140 B2 12/2011 Terry et al.
(Continued)

FOREIGN PATENT DOCUMENTS

CN 1983914 A 6/2007
CN 101106414 1/2008
(Continued)

OTHER PUBLICATIONS

English Translation of CN 101895923 A, retrieved from PE2E Search on Nov. 14, 2022. (Year: 2010).*
(Continued)

*Primary Examiner* — Omar J Ghowrwal
(74) *Attorney, Agent, or Firm* — Slater Matsil, LLP

(57) ABSTRACT

Methods for wireless communications over a wideband carrier are provided. Time-frequency resources of the wideband carrier within a transmission time interval are divided into multiple time-frequency resource blocks. Each of the time-frequency resource blocks corresponds to a group of contiguous subcarriers of the wideband carrier and orthogonal frequency division multiplexing symbols. Data streams may be scheduled to be transmitted in different time-frequency resource blocks, and may be destined for different user equipments or the same user equipment. Baseband processing operations may be performed on data streams scheduled in different time-frequency resource blocks independently from one another. Separate control channels or one common control channel may be configured for data transmissions in different time-frequency resource blocks.

20 Claims, 13 Drawing Sheets

Related U.S. Application Data continuation of application No. 15/156,944, filed on May 17, 2016, now Pat. No. 10,142,068.

(60) Provisional application No. 62/165,688, filed on May 22, 2015.

(56) References Cited

U.S. PATENT DOCUMENTS

| | | | |
|---|---|---|---|
| 8,953,641 B2* | 2/2015 | Li | H04L 5/0044 |
| | | | 370/482 |
| 10,111,236 B2 | 10/2018 | Deguchi et al. | |
| 2002/0093926 A1 | 7/2002 | Kilfoyle | |
| 2006/0104382 A1 | 5/2006 | Yang et al. | |
| 2007/0153928 A1 | 7/2007 | Liu et al. | |
| 2008/0232504 A1 | 9/2008 | Ma et al. | |
| 2009/0003427 A1 | 1/2009 | Yan et al. | |
| 2009/0110038 A1 | 4/2009 | Montojo et al. | |
| 2009/0149187 A1* | 6/2009 | Miki | H04L 5/0058 |
| | | | 455/450 |
| 2009/0245401 A1 | 10/2009 | Chrabieh et al. | |
| 2010/0278109 A1 | 11/2010 | Papasakellariou et al. | |
| 2012/0039232 A1 | 2/2012 | Kwon et al. | |
| 2012/0087664 A1 | 4/2012 | Zhang et al. | |
| 2013/0039199 A1 | 2/2013 | Liao et al. | |
| 2013/0294369 A1* | 11/2013 | Dinan | H04L 5/001 |
| | | | 370/329 |
| 2014/0003452 A1 | 1/2014 | Han et al. | |
| 2014/0029584 A1 | 1/2014 | Qu et al. | |
| 2014/0153625 A1 | 6/2014 | Vojcic et al. | |
| 2014/0286299 A1 | 9/2014 | Ihm et al. | |
| 2015/0200758 A1 | 7/2015 | Wakabayashi | |
| 2015/0254104 A1 | 9/2015 | Kessler et al. | |
| 2015/0341942 A1 | 11/2015 | Lee et al. | |
| 2016/0039199 A1 | 2/2016 | Hiyoshi et al. | |
| 2016/0119948 A1 | 4/2016 | Damnjanovic et al. | |
| 2016/0205692 A1* | 7/2016 | Zhang | H04W 72/0453 |
| | | | 370/329 |
| 2016/0337012 A1 | 11/2016 | Kimura et al. | |
| 2016/0345347 A1 | 11/2016 | Cheng et al. | |
| 2017/0187444 A1 | 6/2017 | Murakami et al. | |
| 2017/0195097 A1 | 7/2017 | Ma et al. | |

FOREIGN PATENT DOCUMENTS

| | | | | |
|---|---|---|---|---|
| CN | 101690055 A | | 3/2010 | |
| CN | 101895923 A | * | 11/2010 | .......... H04W 52/365 |
| CN | 102684828 A | | 9/2012 | |
| CN | 104272831 A | | 1/2015 | |
| CN | 104485984 A | | 4/2015 | |
| CN | 105099967 A | | 11/2015 | |
| WO | 2012172323 A1 | | 12/2012 | |
| WO | 2014049325 A1 | | 4/2014 | |

OTHER PUBLICATIONS

"3rd Generation Partnership Project; Technical Specification Group Radio Access Network; Evolved Universal Terrestrial Radio Access (E-UTRA); Physical channels and modulation (Release 12)", 3GPP TS 36.211 V12.5.0 (Mar. 2015), 136 pages.

"3rd Generation Partnership Project; Technical Specification Group Radio Access Network; Evolved Universal Terrestrial Radio Access (E-UTRA); Multiplexing and channel coding (Release 12)", 3GPP TS 36.212 V12.4.0, (Mar. 2015), 94 pages.

"3rd Generation Partnership Project; Technical Specification Group Radio Access Network; Evolved Universal Terrestrial Radio Access (E-UTRA); Physical layer; Measurements (Release 12)," 3GPP TS 36.214 V12.2.0 (Mar. 2015), 17 pages.

"3rd Generation Partnership Project; Technical Specification Group Radio Access Network; NR; Physical layer procedures for control (Release 15)," 3GPP TS 38.213 V15.2.0 (Jun. 2018), 98 pages.

"3rd Generation Partnership Project; Technical Specification Group Radio Access Network; NR; Physical channels and modulation (Release 15)," 3GPP TS 38.211 V15.2.0 (Jun. 2018), 93 pages.

Panasonic, "ACK/NACK resource indication for carrier aggregation and SORTD", 3GPP TSG RAN WG1 Meeting #62, R1-104888, 5 pages, Aug. 23-27, 2010, Madrid, Spain.

Intel Corporation (UK) Ltd., "Resource Allocation for PUCCH Format 1b with Channel Selection", 3GPP TSG RAN WG1 Meeting #63bis, R1-110254, 4 Pages, Jan. 17-Jan. 2, 2011, Dublin, Ireland.

Samsung, "Inter Carrier Discovery", 3GPP TSG RAN WG2 Meeting #90, R2-152144, May 25-May 29, 2015, 6 pages, Fukuoka, Japan.

* cited by examiner

METHODS AND APPARATUS FOR WIRELESS COMMUNICATIONS OVER SUBSETS OF CONTIGUOUS SUBCARRIERS

CROSS-REFERENCE TO RELATED APPLICATIONS

This application is a Continuation of U.S. application Ser. No. 16/183,527 (Now U.S. Pat. No. 10,848,278, issued on Nov. 24, 2020), filed on Nov. 7, 208, which is a Continuation of U.S. application Ser. No. 15/156,944 (Now U.S. Pat. No. 10,142,068, issued on Nov. 27, 2018), filed on May 17, 2016, which claims priority to U.S. Provisional Application No. 62/165,688, filed on May 22, 2015, which applications are hereby incorporated herein by reference in their entirety.

TECHNICAL FIELD

The present invention relates generally to wideband wireless communications, and in particular embodiments, to techniques and mechanisms for a device, network, and method for wideband long term evolution (LTE) with virtual (baseband) carrier aggregation.

BACKGROUND

The amount of data communicated in wireless networks is continuing to grow at an unprecedented pace. Cellular communications systems, which utilize microwave spectrum bands (300 MHz to 3 GHz), have become capacity limited in view of increased interferences and traffic loads. Use of high frequency bands, such as frequency bands of 5 GHz, 28 GHz, 38 GHz, 60 GHz and 73 GHz, where vast amounts of bandwidths are available, are being considered as one of the schemes to meet the ever increasing capacity need for wireless communications. The use of these high frequency bands can help mitigate the capacity problem currently observed. It is thus desirable to develop techniques and methods for wideband wireless communications.

SUMMARY

Technical advantages are generally achieved, by embodiments of this disclosure which describe a device, network, and method for wideband long term evolution (LTE) with virtual (baseband) carrier aggregation.

In accordance with an embodiment, a method for wireless communications over a carrier is provided. The method includes performing, by a device, baseband processing on a first data stream to generate a first baseband signal. The first baseband signal is assigned to be transmitted over a first group of contiguous subcarriers in the carrier within a transmission time interval (TTI). The method also includes performing, by the device, baseband processing on a second data stream, independently from the first data stream, to generate a second baseband signal. The second baseband signal is assigned to be transmitted over a second group of contiguous subcarriers in the carrier within the TTI. The second group of contiguous subcarriers is different from the first group of contiguous subcarriers. The method further includes transmitting the first baseband signal and the second baseband signal over the carrier. A device for performing the method is also provided.

In accordance with another embodiment, a method for wireless communications is provided. The method includes receiving, by a device, an orthogonal frequency division multiplexing (OFDM) signal transmitted over a single carrier within a transmission time interval, and obtaining, from the OFDM signal, a first baseband signal carried over a first group of contiguous subcarriers in the single carrier and a second baseband signal carried over a second group of contiguous subcarriers in the single carrier. The method also includes performing a first baseband processing operation on the first baseband signal to obtain a first data stream, and performing a second baseband processing operation on the second baseband signal independently of the first baseband signal to obtain a second data stream.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 21 illustrates a flowchart of yet another embodiment method for wireless communications over a carrier;

FIG. 22 illustrates a flowchart of yet another embodiment method for wireless communications over a carrier;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
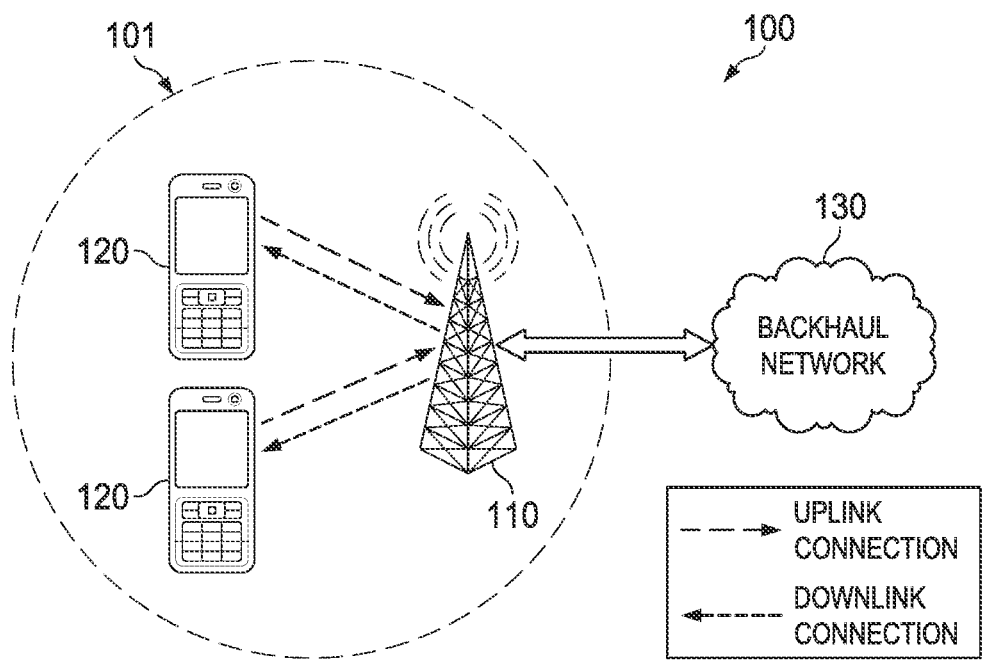
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Utilizing carriers with large/wide bandwidths for wireless communications may increase capacity of wireless communications systems. However, utilizing such carriers may require redesign of baseband processing operations and hardware blocks, and increase complexity and cost for implementing such communications systems.

Aspects of the present disclosure provide a system and method for wireless communications over a carrier with a wide bandwidth (i.e., a wideband carrier). Examples of such a carrier may have a spectrum in frequency bands of 5 GHz, 28 GHz, 38 GHz, 60 GHz and 73 GHz. In according to some embodiments, time-frequency resources of the wideband carrier within a transmission time interval may be divided into multiple time-frequency resource blocks. Each of the time-frequency resource blocks corresponds to a group of contiguous subcarriers of the wideband carrier and orthogonal frequency division multiplexing (OFDM) symbols. Different data streams may be scheduled to be transmitted in different time-frequency resource blocks within a TTI. The different data streams may be destined for different user equipments or the same user equipment. Data streams scheduled in different time-frequency resource blocks within a TTI may be processed for baseband processing independently from one another. Examples of baseband processing operations may include channelization, forward error correction (FEC) encoding, transport block mapping, rate matching, interleaving, hybrid automatic repeat request (HARQ) configuration, and transmission mode configuration.

In some embodiments, each of the group of contiguous subcarriers of the wideband carrier may correspond to a virtual carrier, because these contiguous subcarriers function similarly to subcarriers of a single carrier in microwave band of a current wireless communications system. A time-frequency resource block corresponding to such a virtual carrier is referred to a virtual carrier resource block (VCRB). As used herein, a VCRB defines time-frequency resources within the bandwidth of a virtual carrier in the frequency domain and OFDM symbols in the time domain. In one embodiment, time-frequency resources of a wideband carrier within a TTI may be divided into VCRBs corresponding to different virtual carriers and different number of OFDM symbols. In another embodiment, time-frequency resources of a wideband carrier in different TTIs may be divided into different number of VCRBs. Configuration information about how time-frequency resources of a wideband carrier are divided in terms of VCRBs in a TTI or in a subframe may be a priori information known to UEs, or signaled to the UEs. Thus, when a wideband carrier is divided into virtual carriers, each of which is similar to a LTE carrier, baseband operations for data carried over such a virtual carrier may be designed according to LTE systems. As such, UEs may not need to change their baseband processing operations and processing hardware, and a UE that only supports transmissions over one virtual carrier may still be able to access a communications system of a wideband carrier. This will greatly reduce complexity and cost for implementing wideband communications systems.

In some embodiments, separate control channels may be configured for data transmissions in different VCRBs within a TTI. Alternatively, one common control channel may be configured for data transmissions in different VCRBs within a TTI. In one embodiment, one scheduling grant may be transmitted to a UE, which schedules data transmissions of the UE over one or more VCRBs within a TTI. Alternatively, multiple scheduling grants may be transmitted to a UE within a TTI. The multiple scheduling grants schedule data transmissions of the UE over multiple VCRBs within the TTI. A single synchronization channel may be configured for data transmissions in different VCRBs.

FIG. 1 illustrates a network 100 for wirelessly communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a WI-FI access point (AP), a base terminal station, a communications controller, a network controller, a controller, or other wirelessly enabled devices. Base stations may provide wireless access in accordance with one or more wireless communication protocols, e.g., long term evolution (LTE), LTE advanced (LTE-A), High Speed Packet Access (HSPA), WI-FI 802.11a/b/g/n/ac, etc. As used herein, the term "mobile device" refers to any component (or collection of components) capable of establishing a wireless connection with a base station, such as a user equipment (UE), a mobile station (STA), a user, a subscriber, a terminal, and other wirelessly enabled devices. In some embodiments, the network 100 may comprise various other wireless devices, such as relays, low power nodes, etc.

Typically, in a modern wireless communications system, such as a third generation partnership project (3GPP) LTE compliant communications system, a plurality of cells or eNBs may be arranged into a cluster of cells, with each cell having multiple transmit antennas. Additionally, each cell or eNB may be serving a number of UEs based on a priority metric, such as fairness, proportional fairness, round robin, and the like, over a period of time. It is noted that the terms of "cell", "transmission point", and "eNB" may be used interchangeably. Distinction between cells, transmission points, and eNBs will be made where needed.

Data in a wireless network may be transmitted using different transmission technologies, such as the OFDM transmission technology. In OFDM systems, the frequency bandwidth of a carrier is divided into multiple subcarriers in the frequency domain. In the time domain, one subframe is divided into multiple OFDM symbols. An OFDM symbol may have a cyclic prefix (CP) to avoid inter-symbol interference due to multiple path delays. One resource element (RE) is defined by a time-frequency resource within one subcarrier and one OFDM symbol. A number of REs form a resource block (RB). Reference signals and other signals, such as data channels, e.g. physical downlink shared channels (PDSCHs), and control channels, e.g. physical downlink control channels (PDCCHs), are orthogonal and multiplexed in different REs in the time-frequency domain. Further, these signals are modulated and mapped into REs. Using inverse Fourier transform per each OFDM symbol, signals in the frequency domain are transformed into signals in the time domain, and are transmitted with added cyclic prefix to avoid the inter-symbol interference.

Figure 2:
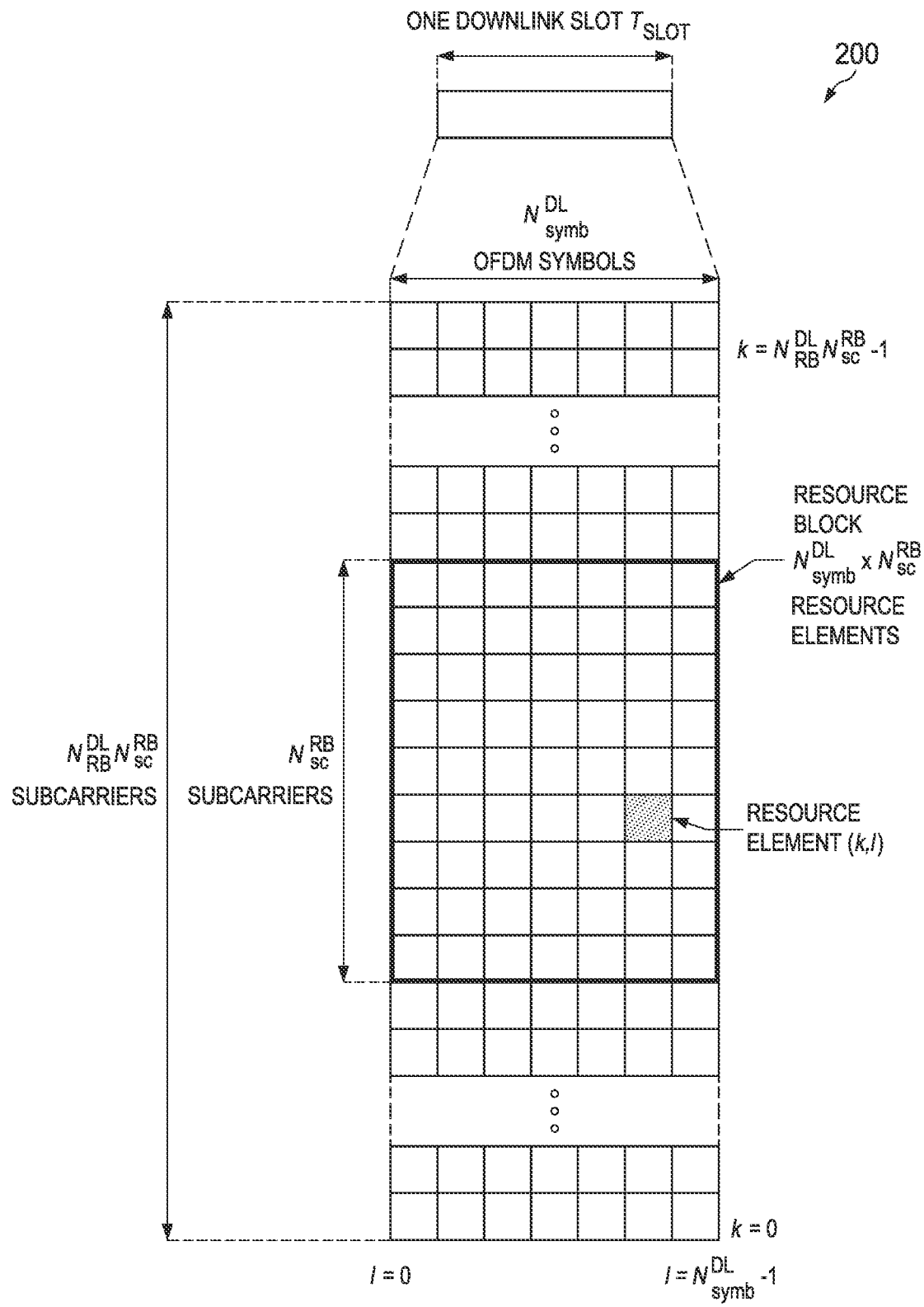
FIG. 2 illustrates a diagram of an embodiment downlink orthogonal frequency division multiplexing (OFDM) slot including OFDMA symbols with normal cyclic prefix.

FIG. 2 illustrates an embodiment downlink OFDM slot 200 including OFDMA symbols with normal cyclic prefix (CP). As shown, the OFDM slot 200 includes $N_{symb}^{DL}$ OFDM symbols, and $N_{RB}^{DL} \times N_{sc}^{RB}$ subcarriers, where $N_{RB}^{DL}$ is the number of RBs and $N_{sc}^{RB}$ is the number of subcarriers in each RB. Each RB contains a number of REs. According to some embodiments, an OFDM subframe includes 14 OFDM symbols labeled from 0 to 13 (not shown). The symbols 0 to 6 (not shown) correspond to even numbered slots, and the symbols 7 to 13 (not shown) correspond to odd numbered slots. FIG. 2 illustrates one slot of an OFDMA subframe including 7 symbols. In one example, a RB includes 12 subcarriers labeled from 0 to 11 and 11 symbols. Thus, there are 132 REs in a RB. An OFDM subframe may include a number of RBs, and the number may depend on the bandwidth of a communications system.

Figure 3:
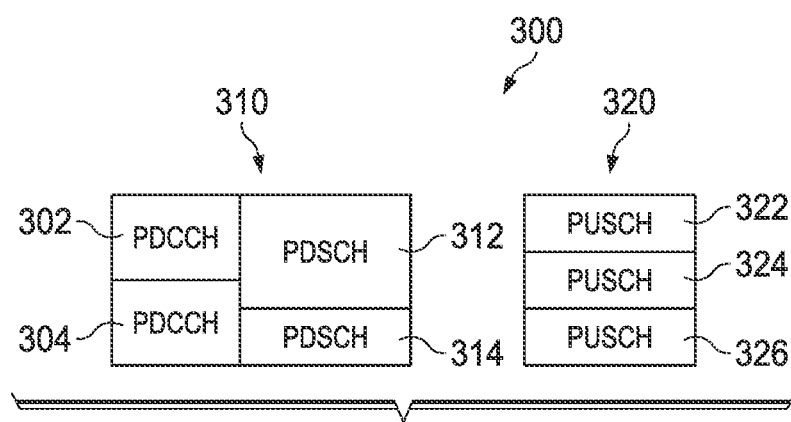
FIG. 3 illustrates a diagram of a downlink OFDM subframe and an uplink OFDM subframe.

A data channel transmitting data packets from an eNB to a UE in a physical layer is called a physical downlink shared channel (PDSCH), and a data channel transmitting data packets from a UE to an eNB in a physical layer is called a physical uplink shared channel (PUSCH). Control information may be carried in physical control channels to indicate where a PDSCH and/or PUSCH are in the frequency domain and in which manner the PDSCH and/or PUSCH are transmitted. A physical control channel transmitting control information from an eNB to a UE is called a physical downlink control channel (PDCCH). FIG. 3 illustrates example PDCCHs, PDSCHs and PUSCHs in a downlink OFDM subframe 310 and an uplink OFDM subframe 320. In FIG. 3, PDCCH 302 may include signaling information for PDSCH 312 or PUSCH 324. PDCCH 304 may include signaling information for PDSCH 314, PUCCH 322, or PUCCH 326. In the 3GPP Rel-11 specification, an enhanced PDCCH (EPDCCH) is defined as a downlink control channel having a similar functionality as a PDCCH. But an EPDCCH may be transmitted in the data region according to the 3GPP Rel-8 specification, and demodulation of an EPDCCH may be based on a dedicated/de-modulation reference signal (DMRS), instead of a common reference signal (CRSs) for a PDCCH.

Figure 4:
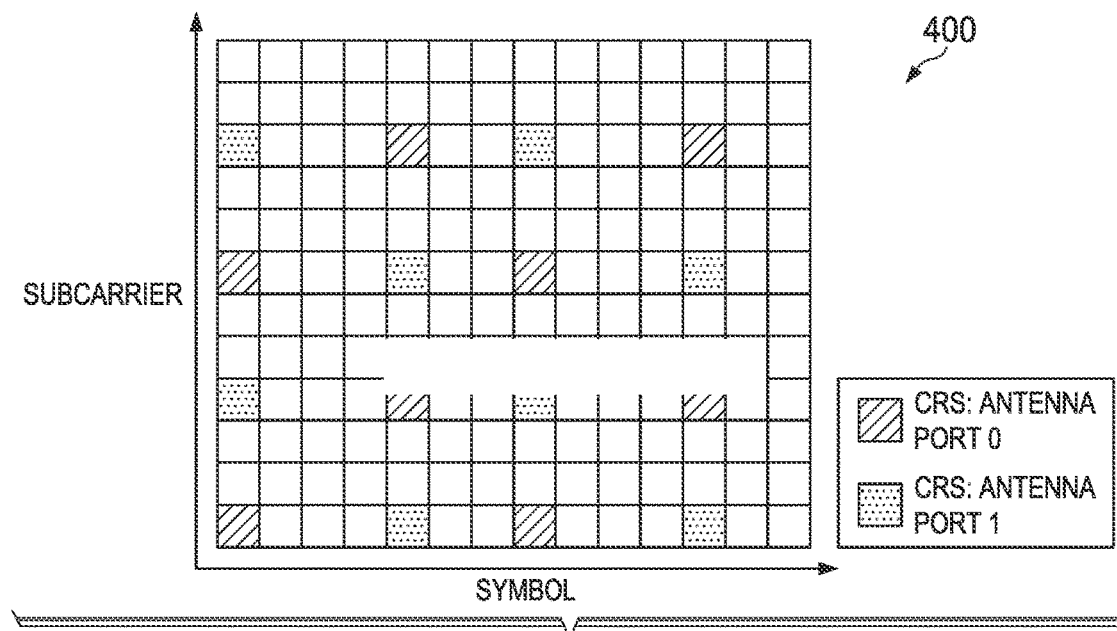
FIG. 4 illustrates a diagram of an embodiment OFDM subframe carrying common reference signals (CRSs)

In an LTE advanced (LTE-A) system, a reference signal (RS) is transmitted for a UE to perform channel estimation for demodulation of a PDCCH and other common channels, as well as for measurement of communication channels and providing feedbacks. The RS may be a common/cell-specific reference signal (CRS) inherited from the 3GPP Rel-8/9 specification of evolved universal terrestrial radio access (E-UTRA). FIG. 4 illustrates CRSs transmitted in an OFDM subframe 400. UE-specific DMRSs can be transmitted together with a PDSCH according to the 3GPP Rel-10 specification of E-UTRA. A DMRS is used for channel estimation during PDSCH demodulation. A DMRS may also be transmitted together with an EPDCCH for channel estimation of the EPDCCH by a UE.

Figure 5:
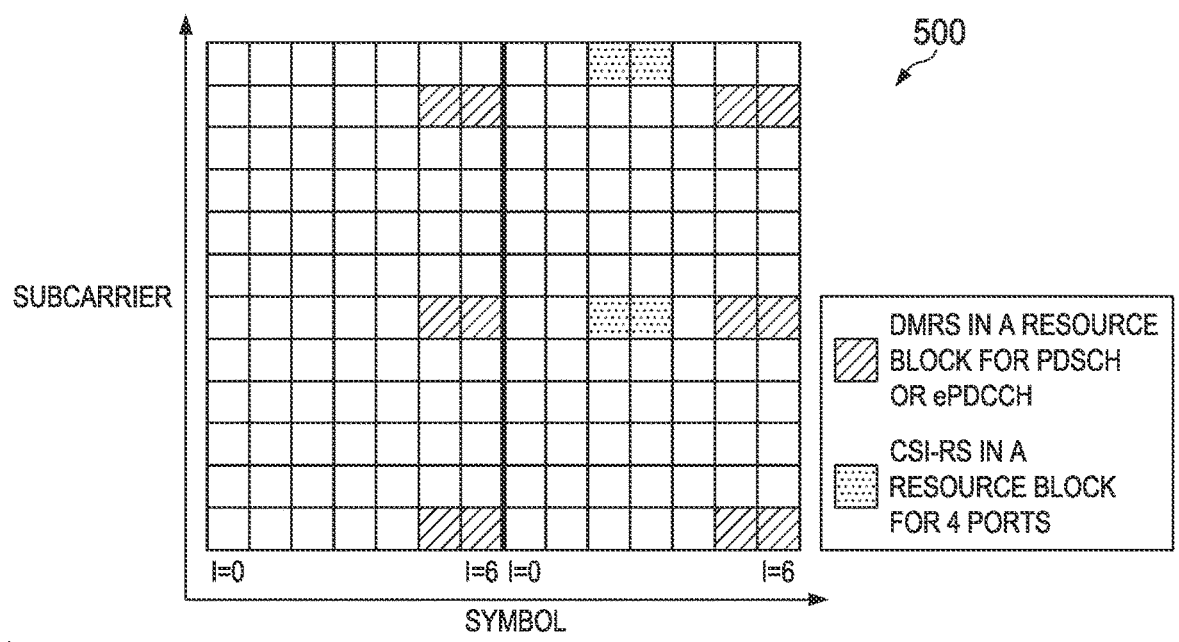
FIG. 5 illustrates a diagram of an embodiment OFDM subframe carrying channel status indicator reference signals and de-modulation reference signals.

In the 3GPP Rel-10 specification for E-UTRA, a channel status indicator reference signal (CSI-RS) is introduced in addition to the CRS and DMRS. CSI-RS is used for UEs compliant with the E-UTRA Rel-10 standard to measure channel status, especially when multiple antennas are involved for transmission. FIG. 5 illustrates CRS-RSs and DMRs transmitted in an OFDM subframe 500. The precoding matrix indicator (PMI), channel quality indicator (CQI), rank indicator of (RI) of a precoding matrix, and other feedback data may be generated according to the measurement of CSI-RS for 3GPP Rel-10 and beyond UEs. There may be multiple CSI-RS resources configured for a UE. A specific time-frequency resource and a scrambling code are assigned for each CSI-RS resource by an eNB.

Reference signals, e.g., CRSs, CSI-RSs or DMRSs, may be used for a receiver to estimate channel impulse responses and/or channel power delay profiles (PDPs). A RS is typically a pseudorandom sequence that is quadrature phase shift keying (QPSK) modulated on subcarriers assigned for the RS transmission. Upon receiving a RS, a receiver performs demodulation and descrambling by multiplying the conjugate of the pseudorandom sequence. The resulted signal is then transformed into the time domain by an inverse fast Fourier transform (IFFT) operation to obtain an estimated PDP. Further measurements may be performed based on the obtained PDP estimate. For different tone spacings (i.e. subcarrier spacings), the PDP estimation time range may have different values. For example, when a RS occupies contiguous tones in an OFDM symbol, the time range is equal to the symbol duration. When the RS uniformly occupies one tone out of every 6 tones in an OFDM symbol, the time range is equal to one sixth of the symbol duration. RSs from different transmitters may be assigned to different sets of subcarriers and thus are separated in the frequency domain. RSs from different transmitters may also be assigned with different pseudorandom sequences and thus are separated via low correlation with one another. In addition, RSs may further be assigned to be transmitted on the same set of subcarriers, using the same pseudorandom sequence. In this case, the RSs may strongly interfere with each other. In current LTE systems, the same pseudorandom sequence are used for RSs of different cells on the same set of time/frequency resources only when the cells are far apart from each other, so that RS interferences may be reduced to an allowable range. Generally, how RSs are transmitted may be determined at network planning.

A heterogeneous network (HetNet) may include a macro cell and a pico cell, or more generally, a higher power node/antenna with a larger coverage and a lower power node/antenna with a smaller coverage. Lower power nodes (or lower power points, picos, femtos, micros, relay nodes, remote radio heads, remote radio units, distributed antennas, etc.) generally are low-power wireless access points that operate in a licensed spectrum. Lower power nodes provide improved cellular coverage, capacity and applications for homes and businesses, as well as in metropolitan and rural public spaces.

In the 3GPP Rel-10 specification, a component carrier is called a cell. When multiple cells are controlled by the same eNB, a single scheduler in the same eNB may be used for cross scheduling of multiple cells. In a wireless communications system with carrier aggregation, one eNB may operate and control several component carriers forming a primary cell (Pcell) and a secondary cell (Scell). In accordance with the 3GPP Rel-11 specification, an eNB may control both a macro cell and a pico cell. In this case, backhaul between the macro cell and the pico cell is fast backhaul. The eNB may control the transmission/reception of both macro cell and pico cell dynamically. A PDCCH or an EPDCCH transmitted from macro cells (or points) may be used to indicate PDSCHs or PUSCHs transmitted in the pico cell (or points).

eNBs may be arranged close to each other so that a decision made by a first eNB may have an impact on a second eNB. For example, the eNBs may use their transmit antenna arrays to form beams towards their UEs when serving the UEs. This may mean that if a first eNB decides to serve a first UE in a particular time-frequency resource, it may form a beam pointing to that UE. However, the pointed beam may extend into a coverage area of a second eNB and cause interference to UEs served by the second eNB. The inter-cell interference (ICI) for small cell wireless communications systems is commonly referred to as an interference limited cell scenario. The interference limited cell scenario may be different from a noise limited cell scenario seen in large cell wireless communications systems.

In 3GPP Rel-12 or beyond design, backhaul between a macro cell and a pico cell may not be fast backhaul. In other words, the backhaul may be slow backhaul, or any other type of backhaul. In a slow backhaul scenario, a PDCCH or an EPDCCH transmitted from a macro cell (or point) cannot be used to indicate a PDSCH or a PUSCH transmitted in a pico cell (or point).

In a realistic deployment, an eNB may control one or more cells. Multiple remote radio units may be connected to the same baseband unit of the eNB through fiber cables, and latency between the baseband unit and the remote radio units may be quite small. As such, the same baseband unit can process coordinated transmission/reception of multiple cells. For example, an eNB may coordinate transmissions of multiple cells to a UE, which is called a coordinated multiple point (CoMP) transmission. The eNB may also coordinate reception of multiple cells from a UE, which is called a CoMP reception. In this case, backhaul links between these cells with the same eNB are fast backhaul and scheduling of PDSCHs transmitted in different cells for a UE is coordinated in the same eNB.

As an extension of the HetNet deployment, possibly densely deployed small cells using low power nodes are considered promising to cope with mobile traffic explosion, especially for hotspot deployments in indoor and outdoor scenarios. A low power node generally refers to a node whose transmission power is lower than macro nodes and BS classes. For example, a pico eNB or a femto eNB is a low power node. Small cell enhancement for E-UTRA and E-UTRA networks (E-UTRANs), which is an ongoing study in 3GPP, will focus on additional functionalities for enhanced performance in hotspot areas for indoor and outdoor scenarios using possibly densely deployed low power nodes.

A UE may discover the surrounding cells by identifying the cells through detecting downlink primary synchronization signals (PSSs)/secondary synchronization signals (SSSs) of the cells. Upon identification of one or more cells, the UE performs signal power measurement based upon downlink CRSs of the identified cells. If the measured signal power of a cell is above a certain threshold, the cell is discovered. For mobility and other network operation optimization purposes, a UE may be required to monitor several cells. To increase the chance that the UE is able to discover weaker cells under one or two dominant strong interfering cells, interference cancellation (IC) techniques may be employed. For example, according to one IC method, dominant strong interfering cells may be discovered first by a UE, and their PSSs/SSSs/CRSs are reconstructed and subtracted from signals that the UE has received, generating a remaining signal. Weaker cell discovery is then performed based on the remaining signal. In dense small cell scenarios, there may be several strong interferers of similar strength. In this case, using IC may not help because of the lack of a small number of dominant interferers. In another small cell deployment scenario where some small cells may be silent at certain times, efficient small cell operation may require introduction of techniques for interference management. With the reduced interference, network throughput performance may be maintained or even improved, even when network resources are reduced. For example, when traffic load of a network is light or medium, one or more small cells may be deactivated. If traffic load increases, the network may activate some inactive small cells to support the increased traffic load. In this case, transmission of common signals may be avoided in certain subframes without imposing negative impact to UE measurements. However, if some of the cells may stop transmitting for a long time, discovery of these cells would become challenging.

As the amount of data communicated in a wireless networks are increasing, wireless communications systems utilizing microwave spectrum bands (i.e., 300 MHz to 3 GHz) are reaching their communication capacity limits. One of the solutions that are being considered in view of the capacity limits is to use carriers with wide/large spectrum bands, such as frequency bands of 3.5 GHz, 5 GHz, 28 GHz, 38 GHz, 60 GHz and 73 GHz. It has been shown that some spectrums in large frequency bands are available for use in wireless communications. For example, large licensed spectrum in the 3.5 GHz C-band will have about 400 to 800 MHz contiguous spectrum available in Europe and Japan by 2020 or earlier. These large licensed spectrums and others that are available may be used for wireless communications, expanding communication capacity limitations.

Utilizing a carrier with a wide frequency band (i.e., a wideband carrier) in wireless communication will cause increased propagation path loss and decreased coverage areas. To reduce this effect, the carrier may be divided into subcarriers and the technology of OFDM may be used to transmit data over the subcarriers. Table 1 lists a set of parameters when a wideband carrier is divided into subcarriers with a 60 kHz subcarrier spacing.

TABLE 1

| Sample Rate (Msamp/s) | FFT Size | Max Bandwidth (MHz) | Max No. of Subcarriers |
|---|---|---|---|
| 30.72 | 512 | 20 | 300 |
| 61.44 | 1024 | 40 | 600 |
| 122.88 | 2048 | 80 | 1200 |
|  | 2048 | 120 | 1800 |
| 245.76 | 4096 | 160 | 2400 |
|  | 4096 | 240 | 3600 |
| 491.52 | 8192 | 320 | 4800 |

A wideband carrier may be divided into subcarriers with larger subcarrier spacings. However, even using larger subcarrier spacings, dividing a wideband carrier into subcarriers may still result in a much larger number of subcarriers and OFDM symbols compared with legacy LTE carriers. This may require redesign of components in legacy LTE systems, including baseband processing operations, e.g. transport size configuration, reference signal configuration, channel estimation, forward error correction (FEC) encoding and decoding chain operations, hybrid automatic repeat request (HARQ) configurations, etc., and hardware blocks, increasing complexity and cost for implementing wideband wireless communications systems and products. In addition, redesign and re-verification of hardware will also prolong the time to market of the wideband wireless communications systems and products.

In some embodiments, time-frequency resources of a wideband carrier within a transmission time interval (TTI) may be divided into multiple time-frequency resource blocks. Each time-frequency resource block of the wideband carrier within a TTI corresponds to a group of contiguous subcarriers in the wideband carrier in the frequency domain and OFDM symbols in the time domain. Different data streams may be carried in different time-frequency resource blocks of the wideband carrier within the TTI.

Figure 6:
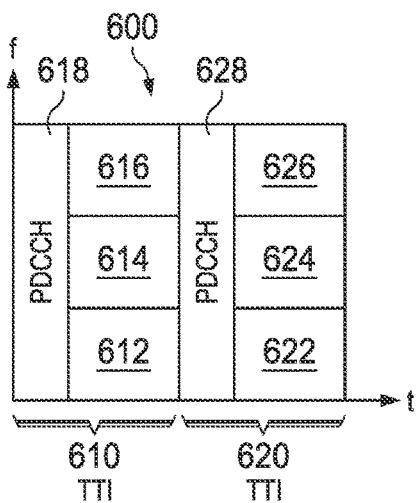
FIG. 6 illustrates a diagram of an embodiment OFDM subframe of a wideband carrier.

FIG. 6 illustrates a diagram of an embodiment OFDM subframe 600 of a wideband carrier. FIG. 6 illustrates time-frequency resources of the wideband carrier within two TTIs. As shown, the time-frequency resources within TTI 610 are divided into three time-frequency resource blocks 612, 614 and 616, and the time-frequency resources within TTI 620 are divided into three time-frequency resource blocks 622, 624 and 626. There are no guard carriers or guard bands between adjacent time-frequency resource blocks within a TTI. TTI 610 and TTI 620 may have the same length or different lengths. In this example, the bandwidth of the wideband carrier is divided into three groups of contiguous subcarriers for both the TTI 610 and TTI 620. The time-frequency resource block 612 has the same frequency bandwidth as that of the time-frequency resource block 622. Similarly, the time-frequency resource block 614 has the same frequency bandwidth as that of the time-frequency resource block 624, and the time-frequency resource block 616 has the same frequency bandwidth as that of the time-frequency resource block 626. In one embodiment, the frequency bandwidths of the time-frequency resource blocks 622, 624 and 626 may be different from those of the time-frequency resource blocks 612, 614 and 616. In another embodiment, the bandwidth of the wideband carrier may be divided into different number of groups of contiguous subcarriers for different TTIs. PDCCH 618 carries control information for the TTI 610, and PDCCH 628 carries control information for the TTI 620.

Figure 7:
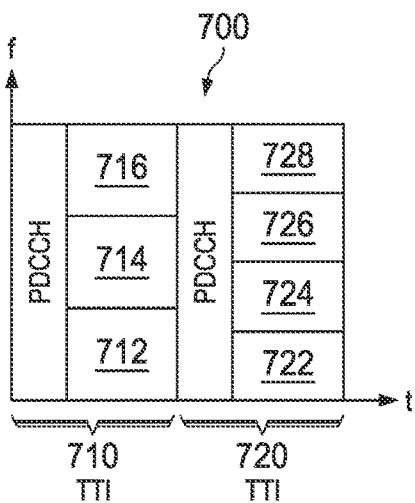
FIG. 7 illustrates a diagram of another embodiment OFDM subframe of a wideband carrier.

FIG. 7 illustrates a diagram of another embodiment OFDM subframe 700 of a wideband carrier. Similar to FIG. 6, FIG. 7 illustrates time-frequency resources of the wideband carrier within two TTIs. In this example, time-frequency resources within different TTIs may be divided into different number of time-frequency resource blocks. As shown, the time-frequency resources within TTI 710 are divided into three time-frequency resource blocks 712, 714 and 716, and the time-frequency resources within TTI 720 are divided into four time-frequency resource blocks 722, 724, 726 and 728. There are no guard carriers or guard bands between adjacent time-frequency resource blocks.

Figure 8:
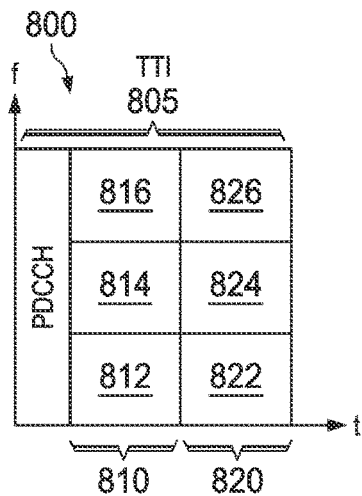
FIG. 8 illustrates a diagram of yet another embodiment OFDM subframe of a wideband carrier.

FIG. 8 illustrates a diagram of another embodiment OFDM subframe 800 of a wideband carrier. FIG. 8 illustrates time-frequency resources of the wideband carrier within one TTI 805. In this example, time-frequency resources within a TTI are divided into time-frequency resource blocks including different time resources within the TTI 805. There are no guard carriers or guard bands between adjacent time-frequency resource blocks. When the time resources are defined in terms of OFDM symbols, a time-frequency resource block may include a first subset of OFDM symbols within the TTI, and another time-frequency resource block may include a second subset of OFDM symbols within the TTI. As shown, the time-frequency resources within the TTI are divided into six time-frequency resource blocks 812, 814, 816, 822, 824 and 826. Each of the time-frequency resource blocks 812, 814 and 816 corresponds to a time interval 810 (e.g., a first subset of OFDM symbols) within the TTI 805, and each of the time-frequency resource blocks 822, 824 and 826 corresponds to another time interval 820 (e.g., a second subset of OFDM symbols) within the TTI 805. In this example, the bandwidth of the wideband carrier is divided into three groups of contiguous subcarriers within the TTI 805. The time-frequency resource block 812 has the same frequency bandwidth as that of the time-frequency resource block 822. Similarly, the time-frequency resource block 814 has the same frequency bandwidth as that of the time-frequency resource block 824, and the time-frequency resource block 816 has the same frequency bandwidth as that of the time-frequency resource block 826. The frequency bandwidths of the time-frequency resource blocks 822, 824 and 826 may also be different from those of the time-frequency resource blocks 812, 814 and 816.

Figure 9:
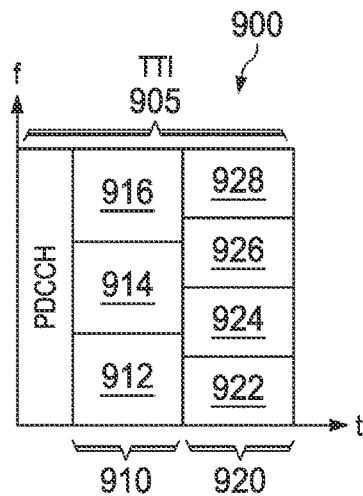
FIG. 9 illustrates a diagram of yet another embodiment OFDM subframe of a wideband carrier.

FIG. 9 illustrates a diagram of another embodiment OFDM subframe 900 of a wideband carrier. FIG. 9 illustrates time-frequency resources of the wideband carrier within one TTI 905. As shown, the time-frequency resources within the TTI 905 are divided into seven time-frequency resource blocks 912, 914, 916, 922, 924, 926 and 928. Each of the time-frequency resource blocks 912, 914 and 916 corresponds to a time interval 910 within the TTI 905. Each of the time-frequency resource blocks 922, 924, 926 and 928 corresponds to another time interval 920 within the TTI 905. There are no guard carriers or guard bands between adjacent time-frequency resource blocks.

The time-frequency resources of a carrier within a TTI may be divided semi-statically, and information about the time-frequency resources of the carrier within a TTI (referred to as carrier resource configuration information), may be made known to UEs communicating over the carrier. Carrier resource configuration information for a TTI may include carrier bandwidth, the number of time-frequency resource blocks divided, the size of each of the time-frequency resource blocks (including the frequency bandwidth and time interval, i.e., number of OFDM symbols), the TTI length, etc. In one embodiment, the carrier resource configuration information is a priori information. For example, time-frequency resources of a carrier may be pre-divided or pre-defined, and the corresponding carrier resource configuration information may be pre-configured into UEs, or specified in a standard followed by UEs. In another embodiment, carrier resource configuration information may be signaled to UEs. For example, carrier resource configuration information may be transmitted in broadcast messages, such as in a master information block (MIB) transmitted on a physical broadcast channel (PBCH), in a system information block (SIB), or in a dedicated radio resource control (RRC) signaling message. In yet another embodiment, some of the carrier resource configuration information is a priori information for UEs, and some of the carrier resource configuration information may be signaled to the UEs. For example, frequency bandwidth of each time-frequency resource block may be a priori known (e.g., specified in the standards) to UEs. The system bandwidth for a wideband LTE system may be transmitted to the UEs, e.g., in a MIB on a PBCH. The UEs may determine other carrier resource configuration information that is needed based on the a priori information and the received information.

Data streams may be mapped to different time-frequency resource blocks within a TTI and transmitted in the different time-frequency resource blocks. A data stream transmitted in one time-frequency resource block within a TTI may be destined for one UE or multiple UEs. Data streams transmitted in multiple time-frequency resource blocks within a TTI may be destined for the same UE. In some embodiments, a data stream to be transmitted in a time-frequency resource block within a TTI may be processed independently from other data streams to be transmitted in other time-frequency resource blocks within the TTI. In one embodiment, separate and independent sets of processing operations may be performed on data streams to be transmitted in different time-frequency resource blocks within a TTI. Each set of processing operations may be defined corresponding to each group of contiguous subcarriers, and may be referred to as a set of self-contained operations of the corresponding group of contiguous subcarriers. Each set of the processing operations may also be defined corresponding to each time-frequency resource block within a TTI, and may be referred to as a set of self-contained operations of the corresponding time-frequency resource block. A set of self-contained operations of a group of contiguous subcarriers or a time-frequency resource block may include baseband processing operations and other processing operations necessary for transmitting a data stream in a corresponding time-frequency resource block. For example, such a set of self-contained operations may include channelization, FEC encoding chain operations, transport block mapping, rate matching, interleaving, HARQ operations, subcarrier and OFDM symbol mapping, multi-user multiplexing and etc. In one embodiment, a set of self-contained operations for a group of contiguous subcarriers or a time-frequency resource block may be designed according to the LTE carrier design specified in the specifications of 3GPP technical specifications (TSs) 36.211 and 36.212.

Thus, time-frequency resource blocks within a TTI may operate independently from one another with their corresponding sets of self-contained operations. Time-frequency resources within each of the time-frequency resource blocks may be indexed independently in terms of subcarriers and OFDM symbols. As such, a data stream transmitted in one time-frequency resource block within a TTI may be viewed as being transmitted over time-frequency resources of a single carrier within the TTI in a legacy LTE communications system, and the bandwidth of the time-frequency resource block is the bandwidth of the single carrier. The subcarriers in the time-frequency resource block function similarly to subcarriers of the single carrier. In view of this, the group of contiguous subcarriers in the time-frequency resource block may be referred to as a "virtual" carrier, and the time-frequency resource block may be referred to as a virtual carrier resource block (VCRB). A VCRB may be viewed as including a plurality of RBs within a TTI in a legacy LTE communications system. However, it is noted herein that a virtual carrier is not a real single carrier, and it does not have a DC tone defined. In this disclosure, the terms of "virtual carrier resource block (VCRB)" and "time-frequency resource block" are used interchangeably. Thus a VCRB corresponds to time-frequency resources of a virtual carrier within a number of OFDM symbols. A carrier divided into multiple virtual carriers may be referred to as a physical carrier.

Figure 10:
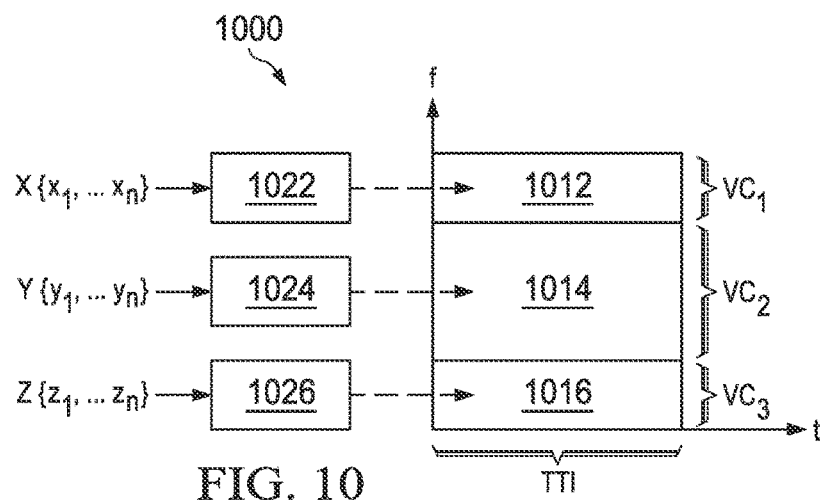
FIG. 10 illustrates a diagram of an embodiment wireless communications system.

FIG. 10 illustrates a diagram of an embodiment wireless communications system 1000 operating at a physical carrier of bandwidth W. Time-frequency resources of the physical carrier within a TTI are divided into VCRB 1012, VCRB 1014 and VCRB 1016 corresponding to virtual carriers VC1, VC2 and VC3. Data stream X$\{x1, \ldots, xn\}$ is to be carried in the VCRB 1012, data stream Y$\{y1, \ldots, yn\}$ is to be carried in the VCRB 1014, and data stream Z$\{z1, \ldots, zn\}$ is to be carried in the VCRB 1016. Separate processing operations are defined for the virtual carriers VC1, VC2 and VC3, or the three VCRBs. Thus, data streams X, Y and Z are processed independently from one another. As shown, the data stream X is processed by a processing unit/module 1022, the data stream Y is processed by a processing unit/module 1024, and the data stream Z is processed by a processing unit/module 1026. The processed data streams X, Y and Z are then mapped to the VCRB 1012, VCRB 1014, and VCRB 1016, respectively, and transmitted over the carrier by the wireless communications system. For example, the data streams X, Y and Z are processed and modulated onto the virtual carriers VC1, VC2 and VC3, respectively, and concatenated in the frequency domain, generating signals in the frequency domain. The concatenated signals may be processed to span the entire bandwidth W of the physical carrier in the frequency domain and transmitted. The data streams X, Y and Z may be destined for different UEs or the same UE. A data stream, e.g., data stream X, may be destined for more than one UE. In this case, data for those UEs may be multiplexed over the group of subcarriers (or virtual carrier) in the VCRB 1012.

Time-frequency resources of a physical carrier may be divided into VCRBs corresponding to virtual carriers of different bandwidths in the frequency domain. The combined virtual carriers cover the bandwidth of the physical carrier. In one embodiment, one or more of the VCRBs may have a bandwidth the same as that of a carrier used in legacy LTE systems. For example, the bandwidth of a virtual carrier of a VCRB may be 1.4 MHz (corresponding to the bandwidth of 6 RBs in a legacy LTE system), 3 MHz (15 RBs), 5 MHz (25 RBs), 10 MHz (50 RBs) and 20 MHz (100 RBs). In this case, baseband processing for data streams carried by such a VCRB may be performed using similar operations of a legacy LTE system.

Figure 11:
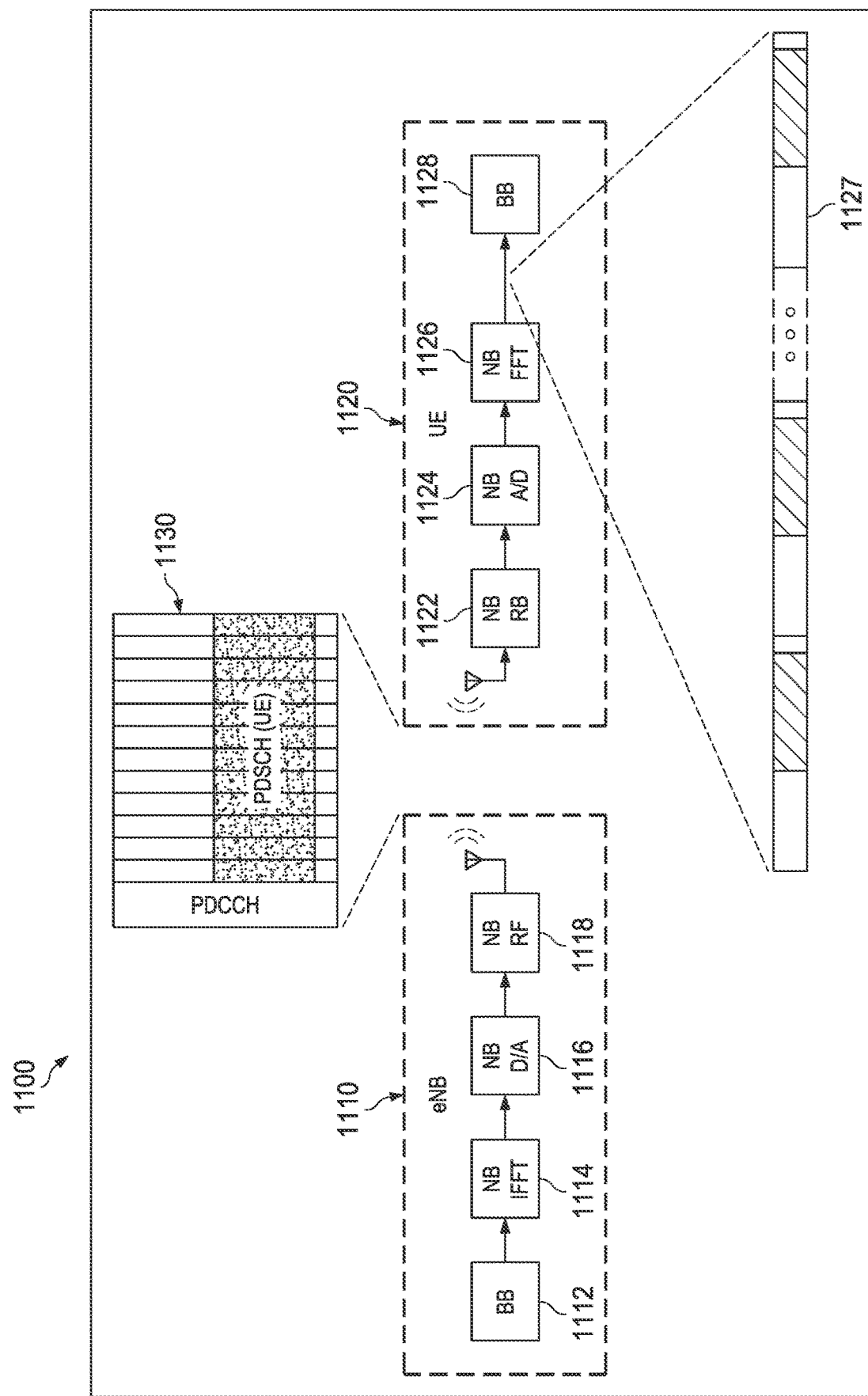
FIG. 11 illustrates a diagram of a legacy long term evolution (LTE) wireless network.

FIG. 11 illustrates a legacy LTE wireless network 1100. FIG. 11 illustrates an eNB 1110 and a UE 1120 communicating with each other in the network 1100. At the eNB 1100, a data stream destined for the UE 1120 are processed by a baseband (BB) processing unit 1112 and transformed into the time domain from the frequency domain by a narrowband (NB) inverse fast Fourier transform unit (IFFT) 1114. The data stream in the time domain is then converted into an analog signal by a NB digital to analog (D/A) converter 1116 and is transmitted passing through a NB radio frequency (RF) unit 1118. Signals transmitted to the UE 1120, i.e., PDSCHs for the UE, are transmitted in a subframe 1130. The subframe 1130 shows the frequency and time resource grid used by a LTE communications system. Upon receipt by the UE 1120, the transmitted signals are processed by a NB RF unit 1122, a NB analog to digital (A/D) converter 1124 and a NB FFT unit 1126, generating baseband signal samples 1127 to be processed by a BB processing unit 1128. The baseband signal samples, i.e., PDSCH symbol samples, may be stored in a memory of the UE 1120 for processing.

Figure 12:
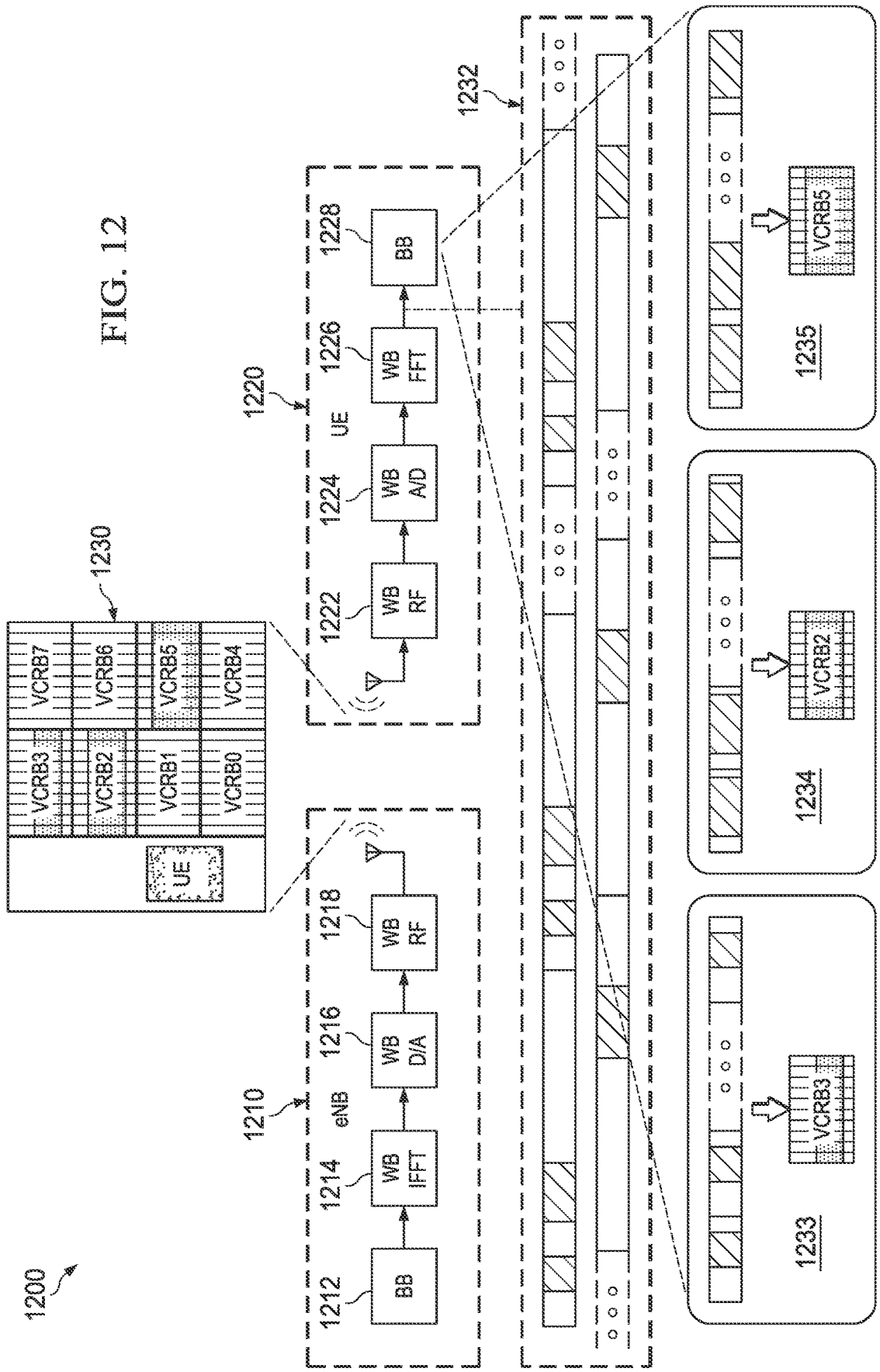
FIG. 12 illustrates a diagram of another embodiment wireless network.

FIG. 12 illustrates a diagram of an embodiment wireless network 1200 communicating over a physical carrier. In this example, an eNB 1210 communicates with UEs including a UE 1220 over the physical carrier. Time-frequency resources of the physical carrier within a TTI are divided into eight VCRBs, i.e., VCRB0-7, as shown in a subframe

1230. Data streams transmitted to the UE 1220 are carried by VCRB2, VCRB3 and VCRB5. The eNB 1210 performs baseband processing operations on data streams to be transmitted, including those destined for the UE 1220, at a BB processing unit 1212. In one embodiment, the BB processing unit 1212 may include a set of BB processing units for independently processing data streams to be carried by different VCRBs. All the processed data streams may be concatenated and further processed to generate a signal that spans the entire bandwidth of the physical carrier. When the physical carrier has a wide bandwidth, the generated signal, spanning a wide bandwidth in the frequency domain, is further processed by a wideband (WB) IFFT unit 1214, a WB D/A converter 1216 and a WB RF unit 1218 for wideband processing, and then transmitted.

When a virtual carrier corresponding to one of the VCRBs is the same as a LTE carrier (a carrier that is defined and used in a legacy LTE system), transmitting PDSCHs by the eNB 1210 over this virtual carrier may be made backward compatible with a legacy LTE system in terms of PDSCH resource allocation and channelization of a normal subframe or a special subframe. In this case, the eNB 1210 transmitting over one or more such virtual carriers may be viewed as performing virtual carrier aggregation (VCA). Further, a UE with capability of supporting data transmissions over one virtual carrier may still access the physical carrier for data transmission.

When the UE 1220 receives a signal transmitted over the physical carrier of a wideband from the eNB 1210, it performs wideband processing on the received signal using a WB RF unit 1222, a WB A/D converter 1224 and a WB FFT unit 1226, outputting PDSCH signal samples 1232 in the frequency domain spanning the entire bandwidth of the wideband carrier. Because only data carried in VCRB2, VCRB3 and VCRB5 are for the UE 1220, the UE 1220 performs baseband processing using a BB processing unit 1228 only on those PDSCH signal samples 1233, 1234 and 1235, which are carried in these time-frequency resources, and obtains the data streams for it. The UE 1220 may process the PDSCH signal samples 1233, 1234 and 1235 independently from one another for baseband processing. As discussed above, a virtual carrier of a VCRB works similar to a single carrier used in a legacy LTE system. Thus, for the UE 1220, PDSCH signal samples, such as the PDSCH signal samples 1233, 1234 and 1235, which is output from the WB FFT unit 1226 and carried over a virtual carrier, are the same as those carried over a legacy LTE carrier. For this reason, the UE 1220 may not need to change its baseband processing units/blocks for performing baseband processing on the PDSCH signal samples 1233, 1234 and 1235 transmitted by the wideband carrier, and the baseband processing operations may be similar to those used in a legacy LTE system of a single carrier.

Figure 13:
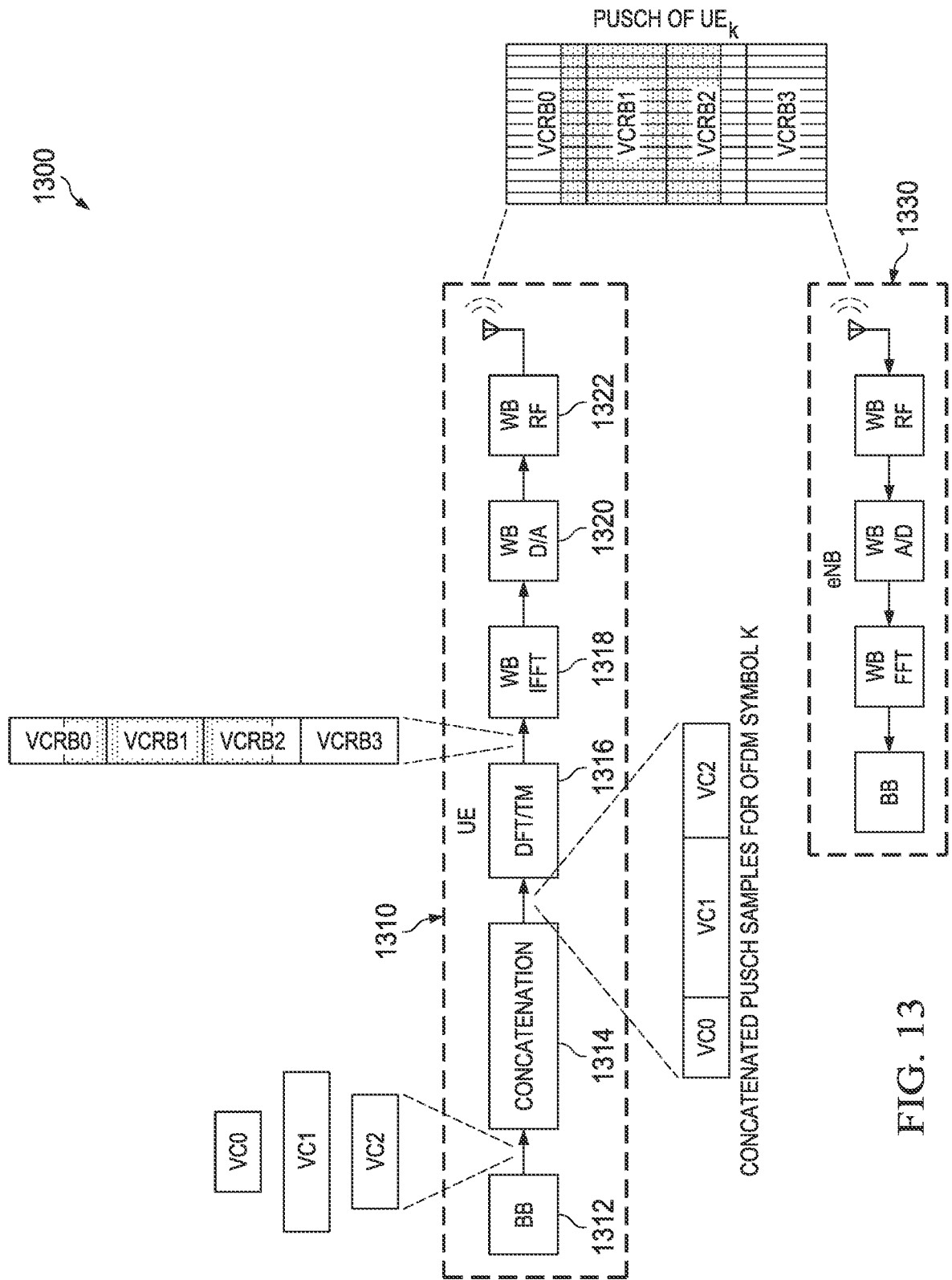
FIG. 13 illustrates a diagram of yet another embodiment wireless network.

FIG. 13 illustrates a diagram of another embodiment wireless network 1300 communicating over a physical carrier. In this example, time-frequency resources of the physical carrier within a TTI are divided into to four VCRBs, namely, VCRB0, VCRB1, VCRB2 and VCRB3. Each of the VCRB0, VCRB1, VCRB2 and VCRB3 corresponds to a virtual carrier, namely, VC0, VC1, VC2 and VC3. A UE 1310 transmits data streams in the VCRB0, VCRB1 and VCRB2 of the physical carrier to an eNB 1330. However, the data streams in VCRB0 and VCRB2 only occupy a subgroup of the subcarriers in VCRB0 and VCRB2, respectively. The data streams are first processed by a BB processing unit 1312 for baseband processing. In one embodiment, the BB processing unit 1312 may include a set of BB processing units for independently processing data streams to be carried in different VCRBs. For example, operations including transport block mapping, HARQ, etc., may be defined independently corresponding to each virtual carrier, and performed within the corresponding virtual carrier. In another example, such operations may be defined independently corresponding to each VCRB. The set of BB processing units modulate data streams to be carried in the VCRBs onto corresponding virtual carriers of the VCRBs for each OFDM symbol within the TTI. FIG. 13 illustrates that the BB processing unit 1312 outputs PUSCH samples modulated onto VC0, VC1 and VC2, respectively, for an OFDM symbol k. The modulated PUSCH samples are then concatenated in the frequency domain at a concatenation unit 1314, generating a concatenated PUSCH samples for the OFDM symbol k. The concatenation may be performed with or without interleaving. The concatenated PUSCH samples are then processed by a DFT/tone mapping (TM) unit 1316 to generate a signal spanning the entire bandwidth of the wideband carrier, and mapped to the corresponding virtual carriers. In this way, the UE maintains the waveform of the wideband carrier for uplink transmissions. The generated signal is further processed by a WB IFFT unit 1318, a WB D/A converter 1320 and a WB RF unit 1322 and transmitted. Upon receipt of the transmitted signal, the eNB 1330 performs wideband signal processing on the received signal at a WB RF unit, a WB A/D unit, and a WB FFT unit, generating baseband signals in the frequency domain. The eNB 1330 then performs baseband processing on the baseband signals independently to obtain data streams transmitted by the UE 1310.

The UE 1310 may be scheduled for PUSCH transmissions on one or multiple virtual carriers, or multiple subcarriers within a virtual carrier, according to the UE's maximum supported data rate. In one embodiment, the scheduled virtual carriers or subcarriers may include subcarriers that are contiguous in frequency across the virtual carriers. As shown in FIG. 13, the subcarriers used to transmit data streams by the UE 1310 in VCRB0, VCRB1 and VCRB2 are contiguous across VC0, VC1 and VC2. Alternatively, the scheduled virtual carriers or subcarriers may include one or more subcarriers that are not contiguous. For example, the UE 1310 may be scheduled for PUSCH transmissions over virtual carriers in VCRB1 and VCRB3, where the virtual carriers are not adjacent to each other. In another example, the UE 1310 may be scheduled for PUSCH transmissions over some subcarriers in VCRB1 and some subcarriers in VCRB3.

When a virtual carrier corresponding to one of the VCRBs is the same as a LTE carrier, transmitting PUSCHs by the UE 1310 over this virtual carrier may be made backward compatible with a legacy LTE system in terms of PUSCH resource allocation and channelization. In this case, a UE transmitting over one or more such virtual carriers may be viewed as performing VCA.

Control channels may be configured for data transmissions in different VCRBs of a physical carrier. In some embodiments, one control channel may be configured for each VCRB. Different VCRBs may carry control channels configured for them. For example, a PDCCH, or an EPDCCH, may be configured for each of the VCRBs of a physical carrier. Each PDCCH may carry a scheduling grant for data transmissions within its corresponding VCRB. A UE may receive multiple scheduling grants carried in PDCCHs on multiple virtual carriers.

Figure 14:
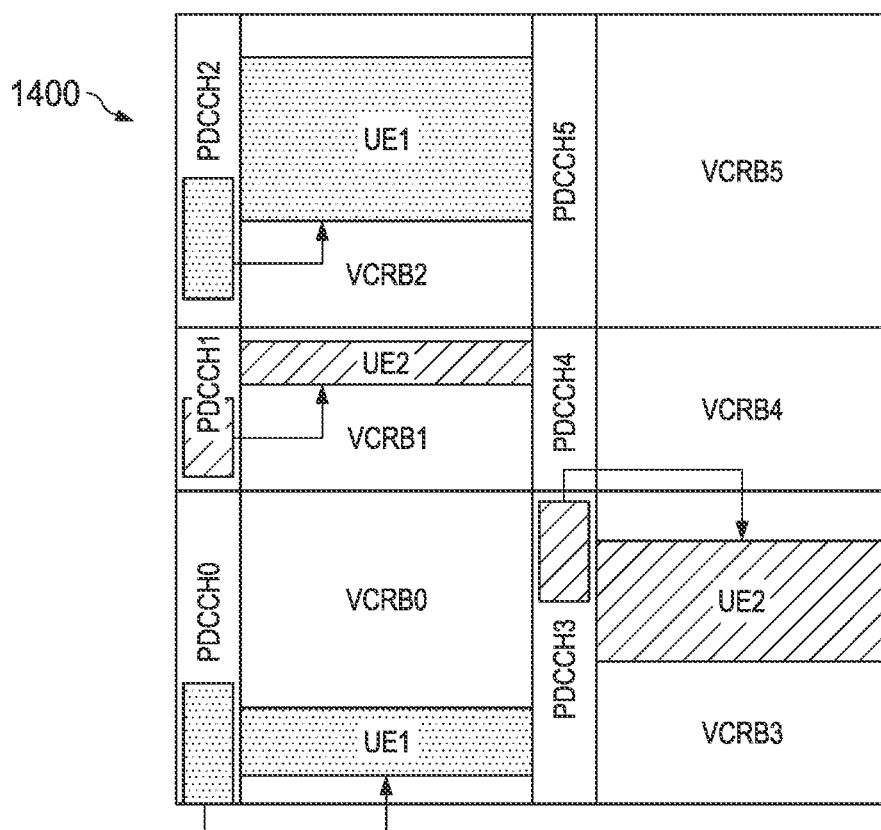
FIG. 14 illustrates a diagram of an embodiment OFDM subframe of a carrier.

FIG. 14 illustrates a diagram of an embodiment OFDM subframe of a physical carrier. FIG. 14 illustrates VCRBs of the physical carrier within a TTI, with one PDCCH configured for each of the VCRBs. As shown, the time-frequency resources of the physical carrier are divided into six VCRBs, namely, VCRB0-VCRB5. Each of the VCRBs carriers a PDCCH, i.e., PDCCH0-PDCCH5, for the corresponding VCRB. PDCCH0 carries a scheduling grant for UE1 for data transmissions in VCRB0. PDCCH2 also carries a scheduling grant for UE1 for data transmissions in VCRB2. Thus, UE1 will receive two scheduling grants carried in this TTI. Similarly, UE2 will receive two scheduling grants. One of the grants is carried in PDCCH1 for data transmissions in VCRB1, and the other is carried in PDCCH3 for data transmissions in VCRB3.

Figure 15:
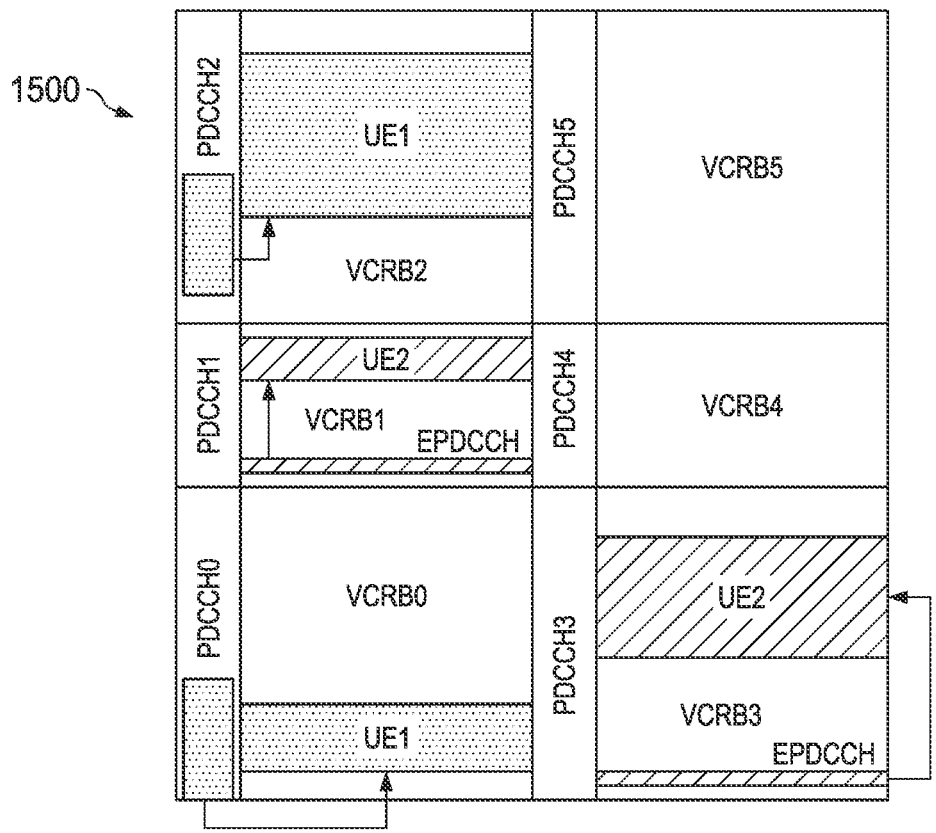
FIG. 15 illustrates a diagram of another embodiment OFDM subframe of a carrier.

FIG. 15 illustrates a diagram of another embodiment OFDM subframe of a physical carrier. Similar to FIG. 14, FIG. 15 illustrates VCRBs of the physical carrier within a TTI, with one PDCCH configured for each of the VCRBs. The time-frequency resources of the physical carrier within the TTI are divided into six VCRBs, namely, VCRB0-VCRB5, and each of the VCRBs carriers a PDCCH, i.e., PDCCH0-PDCCH5, for the corresponding VCRB. PDCCH0 and PDCCH2 carry scheduling grants for UE1. In this example, control information for UE2 is carried in EPDDCHs. As shown, a scheduling grant is carried in an EPDDCH of VCRB1 for data transmission of UE2 in VCRB1, and another scheduling grant is carried in an EPDDCH of VCRB3 for data transmission of UE2 in VCRB3. Control information for other UEs that transmit data in VCRB1 or VCRB3 may still be carried in PDCCH1 or PDCCH3.

Figure 16:
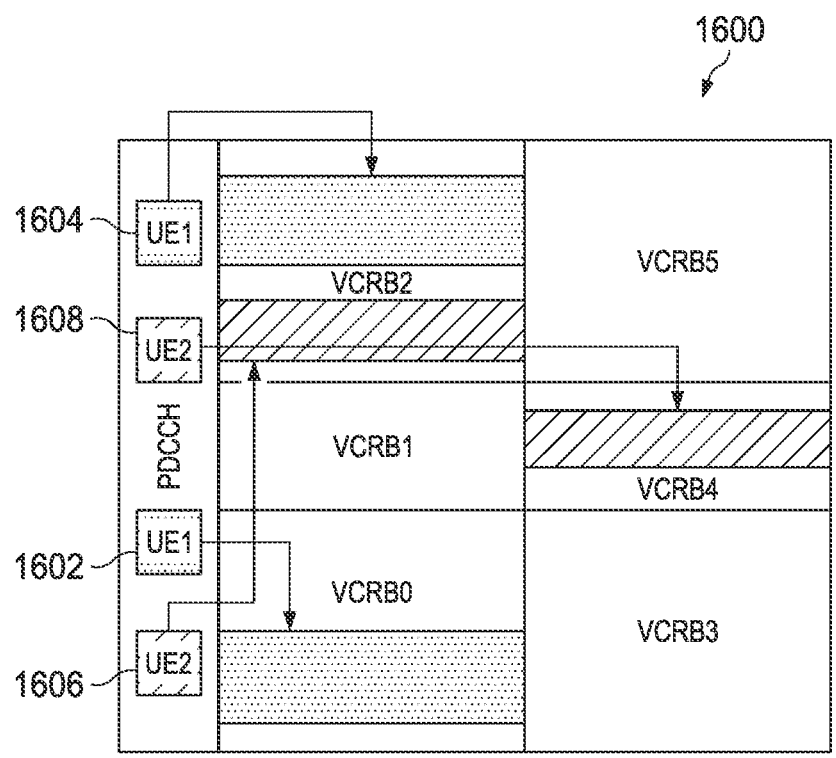
FIG. 16 illustrates a diagram of yet another embodiment OFDM subframe of a carrier.

In some embodiments, a common control channel may be configured for a group of virtual carriers. FIG. 16 illustrates a diagram of yet another embodiment OFDM subframe of a physical carrier. FIG. 16 illustrates VCRBs of the physical carrier within a TTI. The time-frequency resources of the physical carrier within the TTI are divided into six VCRBs, namely, VCRB0-VCRB5, and one PDCCH is configured to carry control information for all the six VCRBs. In this example, data transmissions of a UE in each VCRB are scheduled by one scheduling grant. As shown, the PDCCH carries a scheduling grant 1602 for data transmissions of UE1 in VCRB0, and a scheduling grant 1604 for data transmissions of UE1 in VCRB2. The PDCCH also carries a scheduling grant 1606 for data transmissions of UE2 in VCRB2, and a scheduling grant 1608 for data transmissions of UE2 in VCRB4. Thus, multiple scheduling grants are transmitted for UE1 and UE2. Multiple scheduling grants for one UE are transmitted simultaneously. A UE may blindly decode all the possible scheduling grants.

Figure 17:
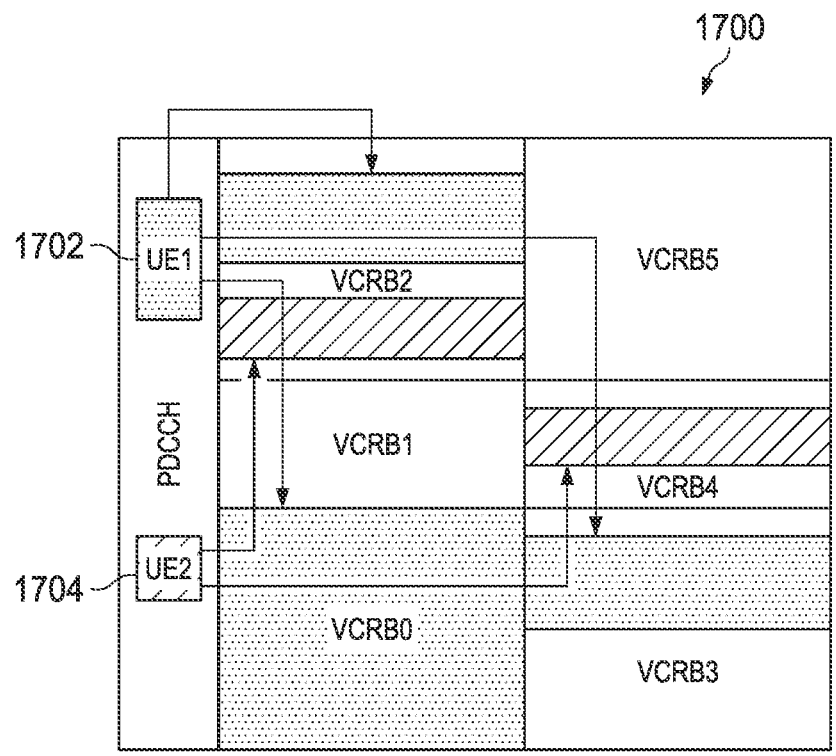
FIG. 17 illustrates a diagram of yet another embodiment OFDM subframe of a carrier.

FIG. 17 illustrates a diagram of yet another embodiment OFDM subframe of a physical carrier. Similar to FIG. 16, FIG. 17 illustrates VCRBs of a physical carrier within a TTI, with one PDCCH configured for all of the VCRBs. The time-frequency resources of the physical carrier within the TTI are divided into six VCRBs, namely, VCRB0-VCRB5, and one PDCCH is configured to carry control information for all the six VCRBs. In this example, data transmissions of a UE in one or more VCRBs are scheduled by one scheduling grant. As shown, the PDCCH carries a scheduling grant 1702 for data transmissions of UE1 in VCRB1, VCRB2 and VCRB3. The PDCCH also carries a scheduling grant 1704 for data transmissions of UE2 in VCRB2, VCRB4.

In one embodiment, a physical carrier may be divided into multiple virtual carriers, and time-frequency resources of the physical carrier within a TTI may be divided into VCRBs based on the multiple virtual carriers. One DC tone may be configured in the middle of the bandwidth of the physical carrier, for transmission of a PSS or a SSS. Each of the virtual carriers may be configured with one or none "virtual" DC tone. However, a virtual DC tone does not carry useful data transmission. In one embodiment, a virtual carrier may be configured in the middle of the bandwidth of the physical carrier as a core band. The virtual carrier may be used to support synchronization, initial access and other procedures. A UE may rely on this virtual carrier to access a wireless communications system.

In one embodiment, one or two CRS ports may be allocated for control channel demodulation. A CRS signal may only exist in OFDM symbols that carry a virtual carrier specific control channel or a common control channel. OFDM symbols used for data transmissions in a VCRB may include one or none CRS in order to reduce overhead. A CRS carried in a VCRB may be used for fine synchronization, RRM and CSI measurements. When an EPDCCH is used as a control channel for data transmissions in a VCRB, one or none CRS port may be allocated in the OFDM symbols of the VCRB. A CRS in such a VCRB may be used for fine synchronization, radio resource RRM and CSI measurements.

In one embodiment, CSI-RSs may be configured in virtual carriers for CSI measurements. A UE may perform CSI measurements independently within a virtual carrier that it is scheduled for data transmissions. Alternatively, the UE may perform CSI measurements based on a CSI-RS signal generated from CSI-RS signals carried over different virtual carriers that the UE is scheduled for data transmissions. For example, CSI-RS signals from different virtual carriers may be concatenated at a UE for CSI measurements. A UE may be configured to report CSIs measured based on CSI-RSs carried over a single virtual carrier (subband CSI) or multiple virtual carriers (wideband CSI). A wideband CSI or a subband CSI is herein defined with respect to the bandwidth of one or multiple virtual carriers carrying the CSI. For example, a CSI is defined as a wideband CSI based on the combined bandwidths of all virtual carriers involved.

In some embodiments, a physical carrier may be divided into virtual carriers, each of which is the same as a legacy LET carrier, and the time-frequency resources of the physical carrier may utilize one of the legacy LTE carrier resource grid mappings. Table 2 shows various PDSCH configurations in terms of number of PDSCH OFDM symbols for normal or special subframes in legacy LTE systems. The first row corresponding to the "Special subframe configuration" column represents time division duplex (TDD) configurations for downlink and uplink subframes, and the second row represents the number of OFDM symbols for a PDSCH corresponding to a TDD configuration. Table 2 shows that the number of PDSCH OFDM symbols ranges from 4 to 13. The length in the time domain of a PDSCH carried in a VCRB may be designed utilizing one of these configurations listed in Table 2, with a CP length added.

TABLE 2

| | Special subframe configuration | | | | | Normal |
| --- | --- | --- | --- | --- | --- | --- |
| Configuration | 1, 6 | 2, 10 | 3, 8 | 4 | 9 | subframe |
| Possible # of PDSCH symbols | 7, 8 | 8, 9 | 9, 10 | 10, 11 | 4, 5 | 11, 12, 13 |

Figure 18:
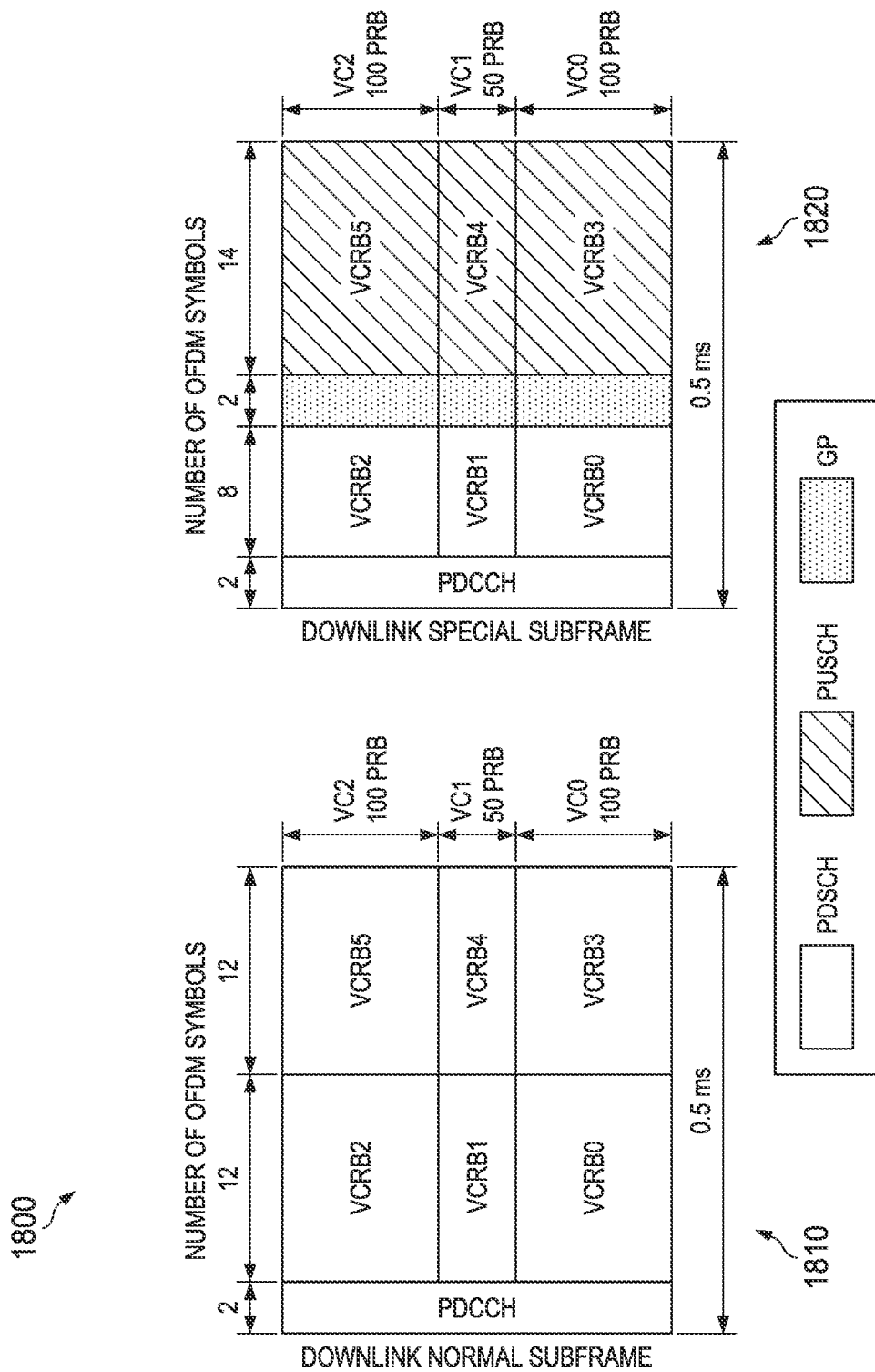
FIG. 18 illustrates a diagram of embodiment downlink OFDM subframes of a carrier.

FIG. 18 illustrates a diagram of embodiment OFDM downlink subframes 1800 of a physical carrier designed based on Table 2. FIG. 18 illustrates a downlink normal subframe 1810 and a downlink special subframe 1820. Each subframe is 0.5 ms in length. In this example, the bandwidth of the physical carrier is 200 MHz, the total number of subcarriers is 3000 tones, subcarrier spacing is 60 kHz, and FFT size is 4096 points. Each subframe of the physical carrier includes 250 RBs, and these RBs are herein referred to as physical resource blocks (PRBs) of the physical carrier. The physical carrier is divided into three virtual carriers, namely, VC0, VC1 and VC2. The virtual carriers VC0, VC1 and VC2 have bandwidths so that there are 100 PRBs corresponding to VC0 in the subframe 1810 or subframe 1820, there are 50 PRBs corresponding to VC1, and 100 PRBs corresponding to VC2. For a subcarrier spacing of 60 kHz, 1 ms contains 60 complete cycles. In this example, one cycle is used as a unit count in designing the subframes of the physical carrier.

The downlink normal subframe 1810 is divided into six VCRBs, namely, VCRB0-VCRB6, all for downlink transmissions. Each VCRB has the same number of OFDM symbols. 12 OFDM symbols are used for each VCRB. Thus, the length of the PDSCH in the subframe 1810 is calculated as 2*12 OFDM symbols=24 cycles. Two OFDM symbols are used for PDCCH of the subframe 1810. Thus, the length of the PDCCH is 2 cycles. The cyclic shift length is thus calculated as (30−26) cycles/26 cycles=2.6 μs.

The downlink special subframe 1820 is divided into six VCRBs. VCRB0-VCRB2 are for downlink transmissions, and VCRB3-VCRB5 are for uplink transmissions. Eight OFDM symbols are used for downlink transmissions, fourteen OFDM symbols are used for uplink transmissions, and two OFDM symbols are used for PDCCH. Therefore, the length of a PDSCH in the subframe 1820 is calculated as 1*8 OFDM symbols=8 cycles. The length of a PUSCH is 1*14 OFDM symbols=14 cycles, and the length of the PDCCH is 2 cycles. Two OFDM symbols are used for downlink-uplink transmission switching, which is 2 cycles. Thus, the cyclic shift length is calculated as (30−26) cycles/26 cycles=2.6 μs.

Figure 19:
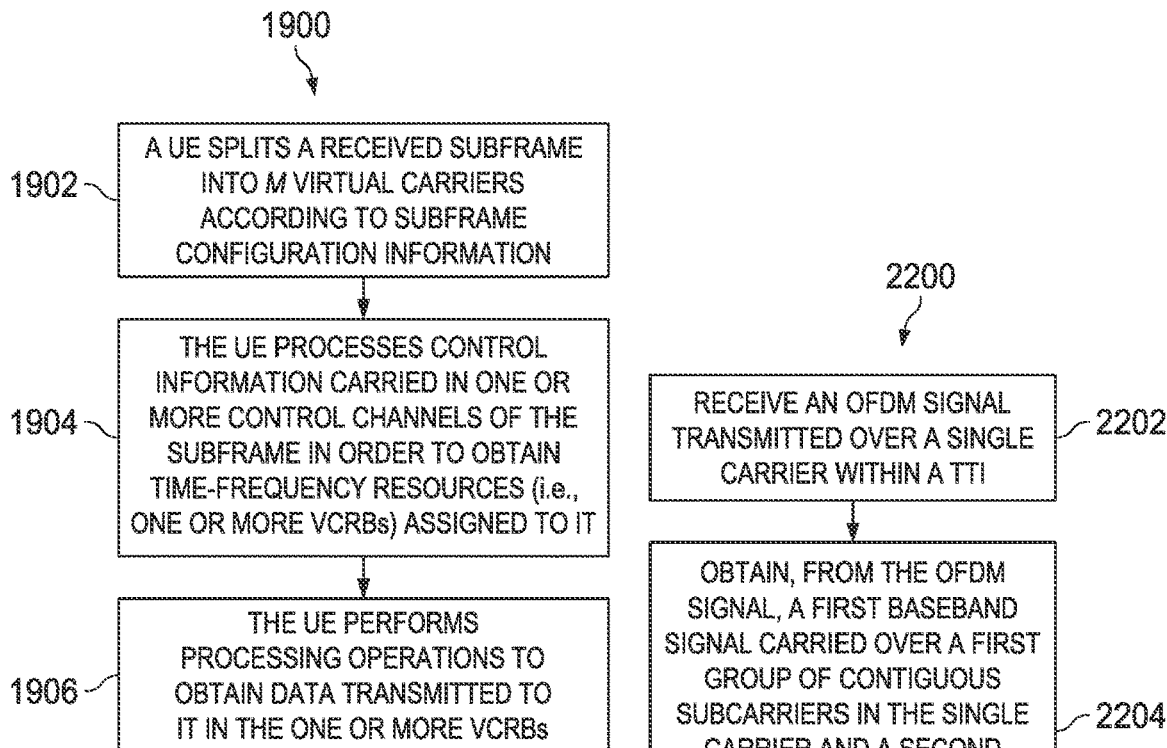
FIG. 19 illustrates a flowchart of an embodiment method for wireless communications over a carrier.

FIG. 19 illustrates a flowchart of an embodiment method 1900 for wireless communications over a physical carrier with a wide bandwidth. A subframe of the physical carrier is divided into N contiguous PRBs. The N PRBs are organized into M virtual carriers of k PRBs. Thus M*K=N. As discussed previously, carrier resource configuration information about how resources of the physical carrier is divided may be a priori known to UEs, communicated to the UEs, or made known to the UEs based on a priori information and received configuration information. At step 1902, when a UE, that has already known the carrier resource configuration information, receives such a subframe, it splits the subframe into M virtual carriers according to the carrier resource configuration information it has known.

At step 1904, the UE processes control information carried in one or more control channels of the subframe in order to obtain time-frequency resources (i.e., VCRBs) assigned to it. A control channel may be a PDCCH, an EPDCCH, or the like. In one embodiment, each virtual carrier may carry its own grant information for data transmission over the corresponding virtual carrier. This may be called virtual self-scheduling. Alternatively, a virtual carrier may carry grant information for one of more virtual carriers. This may be called virtual cross scheduling.

A grant carried over a virtual carrier may include information about PRBs that are assigned to a UE for data transmissions over this virtual carrier. The grant may also include modulation/coding schemes, power control information, and HARQ information, e.g., new data indicator (NDI), for this virtual carrier. In one embodiment, information included in a grant for a virtual carrier may be only valid for this particular virtual carrier. In some embodiments, some information included in a grant on a virtual carrier may be valid for one or more other virtual carriers. For example, the power control information included in a grant of a virtual carrier may be applicable to all virtual carriers.

At step 1906, when the UE receives a grant for receiving data transmissions over a VCRB corresponding to a virtual carrier, the UE performs processing operations to obtain data transmitted to it in the VCRB. For example, the UE may perform channel decoding on PRBs allocated to it in the VCRB, update its soft buffer, and determine whether cyclic redundancy check (CRC) passes. If the CRC passes, the UE may send the decoded information to a higher layer for further processing. If not, the UE may manage its soft buffer and indicate a need for resending the data. The UE may also generate HARQ acknowledgement/negative acknowledgement (ACK/NACK) information for data transmitted in this VCRB. The UE may perform similar processing on data transmitted in different VCRBs. ACK/NACK messages for all receive data in different VCRBs may then be multiplexed together, e.g., according to the carrier aggregation rules in 3GPP Rel-13 specification, and transmitted uplink. The ACK/NACK messages may be transmitted on a PUCCH, or piggy-backed on a PUSCH according to the LTE uplink control information (UCI) transmission rules.

Figure 20:
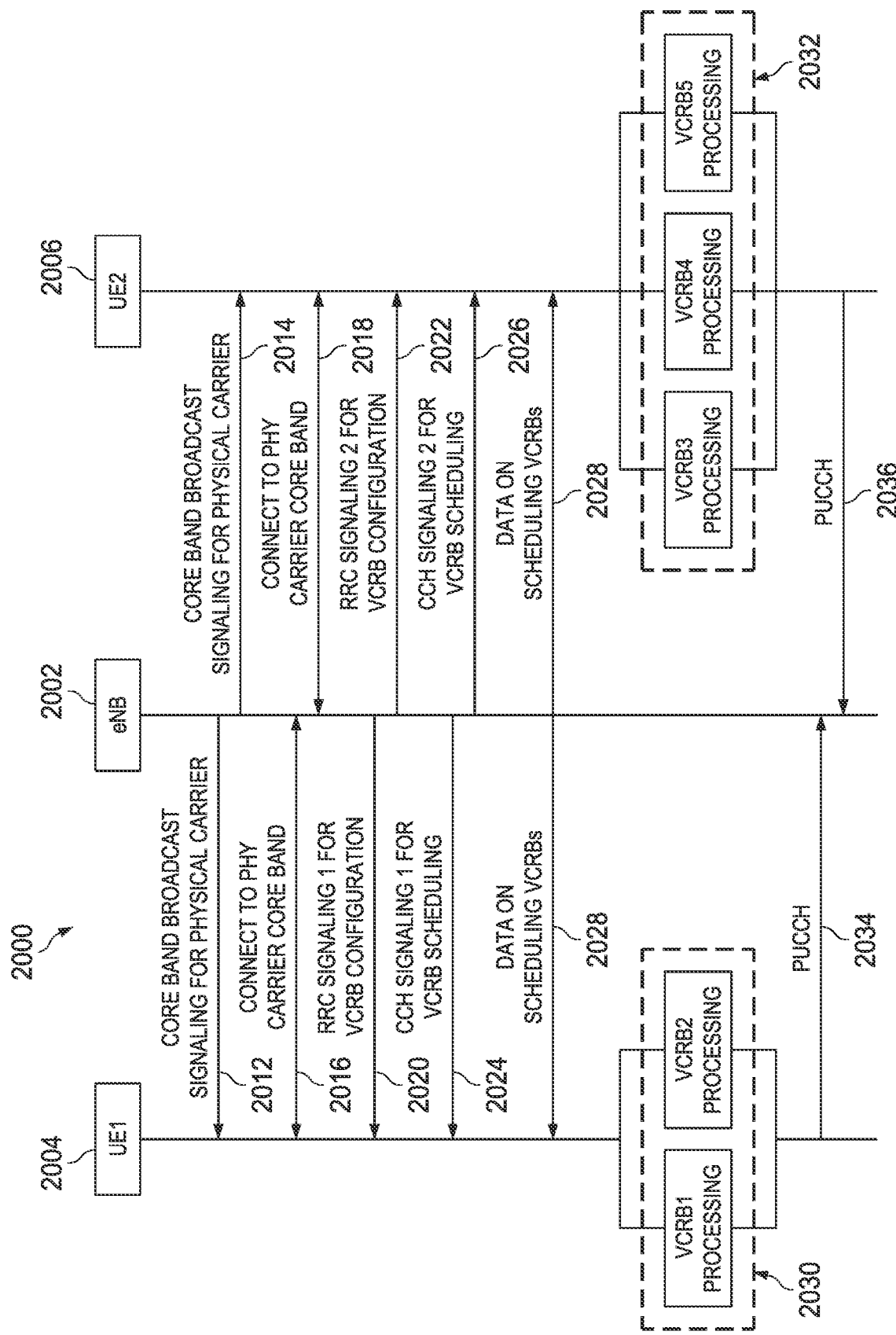
FIG. 20 illustrates a flowchart of another embodiment method for wireless communications over a carrier.

FIG. 20 illustrates a diagram of another embodiment method 2000 for wireless communications over a physical carrier. In this example, an eNB 2002 is communicating with UE1 2004 and UE2 2006 over the physical carrier. In one subframe divided into six VCRBs, namely, VCRB0-VCRB5, VCRB1 and VCRB2 are scheduled for transmitting data to UE1 2004, and VCRB3-VCRB5 are scheduled for transmitting data to UE2 2006. At steps 2012 and 2014, the eNB 2002 broadcasts core band signaling messages of the physical carrier, so that the two UEs may synchronize with it. At steps 2016 and 2018, UE1 2004 and UE2 2006 exchange messages with the eNB 2002 over the core band, respectively, and establish connections with the eNB 2002. At steps 2020 and 2022, the eNB 2002 sends RRC signaling messages to UE1 2004 and UE2 2006, respectively, transmitting configuration information of VCRBs of its physical carrier. At steps 2024 and 2026, the eNB 2002 sends control channels to the two UEs for VCRB scheduling information, respectively. At step 2028, the eNB 2002 transmits data in VCRBs to UE1 2004 and UE2 2006 as scheduled. When UE1 2004 receives the transmitted data, it identifies the VCRBs assigned to it, i.e., VCRB1 and VCRB2, and independently performs processing operations within each of the VCRBs to obtain the data transmitted for it. Similarly, at step 2032, UE2 2006 also identifies VCRBs assigned to it, i.e., VCRB3, VCRB4 and VCRB5, and obtains the data transmitted to it by performing independent processing within each of the assigned VCRBs. At steps 2034 and 2036, each of the UE1 2004 and UE2 2006 may transmit a PUCCH to the eNB 2002 communicating control information for uplink transmissions from the UEs to the eNB 2002.

FIG. 21 illustrates a flowchart of an embodiment method 2100 for wireless communications over a carrier. At step 2102, the method 2100 performs baseband processing on a first data stream to generate a first baseband signal. The first baseband signal is assigned to be transmitted over a first group of contiguous subcarriers in the carrier within a transmission time interval (TTI). At step 2104, the method 2100 perform baseband processing on a second data stream, independently from the first data stream, to generate a second baseband signal. The second baseband signal is assigned to be transmitted over a second group of contiguous subcarriers in the carrier within the TTI. The second group of contiguous subcarriers is different from the first group of contiguous subcarriers. At step 2106, the method 2100 transmits the first baseband signal and the second baseband signal over the carrier. The method 2100 may also modulate the first group of contiguous subcarriers in the carrier in accordance with the first baseband signal, and modulate the second group of contiguous subcarriers in the carrier in accordance with the second baseband signal.

In one embodiment, the method 2100 may transmit the first baseband signal over the first group of contiguous subcarriers in the carrier within a first subset of OFDM in the TTI, and transmit the second baseband signal over the second group of contiguous subcarriers in the carrier within the first subset of OFDM symbols in the TTI. Alternatively, the method 2100 may transmit the first baseband signal over the first group of contiguous subcarriers in the carrier within a first subset of OFDM in the TTI, and transmit the second baseband signal over the second group of contiguous subcarriers in the carrier within a second subset of OFDM symbols in the TTI. The second subset of OFDM symbols is different from the first subset of OFDM symbols in the TTI.

The first group of contiguous subcarriers and the second group of contiguous subcarriers may be adjacent to one another in the frequency domain such that no guard band exists between the first group of contiguous subcarriers and the second group of contiguous subcarriers. The first group of contiguous subcarriers may correspond to a first virtual carrier and the second group of subcarriers may correspond to a second virtual carrier. The first data stream and the second data stream may be destined for the same UE. The baseband processing may include operations such as channelization, FEC encoding, transport block mapping, rate matching, interleaving, HARQ configuration, or transmission mode configuration.

In one embodiment, when the method 2100 determines that the first data stream was not successfully decoded by a UE, it may re-transmit at least a portion of the first data stream over the first group of contiguous subcarriers in the carrier within the TTI. Alternatively, it may re-transmit at least a portion of the first data stream over the second group of contiguous subcarriers in the carrier within the TTI.

In one embodiment, the method 2100 may transmit control information for both the first data stream and the second data stream over a single physical layer control channel. Alternatively, the method 2100 may transmit control information for the first data stream and the second data stream over different physical layer control channels. The method 2100 may further transmit a single synchronization channel for both the first data stream and the second data stream. The method 2100 may also transmit a scheduling grant to a UE within the TTI. The scheduling grant schedules data transmissions of the UE over one or more groups of contiguous subcarriers in the carrier within the TTI. Alternatively, the method 2100 may transmit multiple scheduling grants to a UE within the TTI. The multiple scheduling grants schedule data transmissions of the UE over multiple groups of contiguous subcarriers in the carrier within the TTI. The method 2100 may signal, to a UE, information including at least the first group of contiguous subcarriers in the carrier and the second group of contiguous subcarriers in the carrier.

FIG. 22 illustrates a flowchart of another embodiment method 2200 for wireless communications over a carrier. At step 2202, the method 2200 receives an OFDM signal transmitted over the carrier within a TTI. At step 2204, the method 2200 obtains, from the OFDM signal, a first baseband signal carried over a first group of contiguous subcarriers in the single carrier and a second baseband signal carried over a second group of contiguous subcarriers in the single carrier. The second group of contiguous subcarriers is different from the first group of contiguous subcarriers. At step 2206, the method 2200 performs a first baseband processing operation on the first baseband signal to obtain a first data stream. At step 2208, the method 2200 performs a second baseband processing operation on the second baseband signal independently of the first baseband signal to obtain a second data stream. The first group of contiguous subcarriers and the second group of contiguous subcarriers may be adjacent to one another in the frequency domain. The method 2200 may be performed by a UE.

Though the embodiments of the present disclosure are described with respect to LTE systems, they may also be applicable in other wireless communications systems, such as high speed packet access (HSPA) systems, WI-FI systems, etc.

Figure 23:
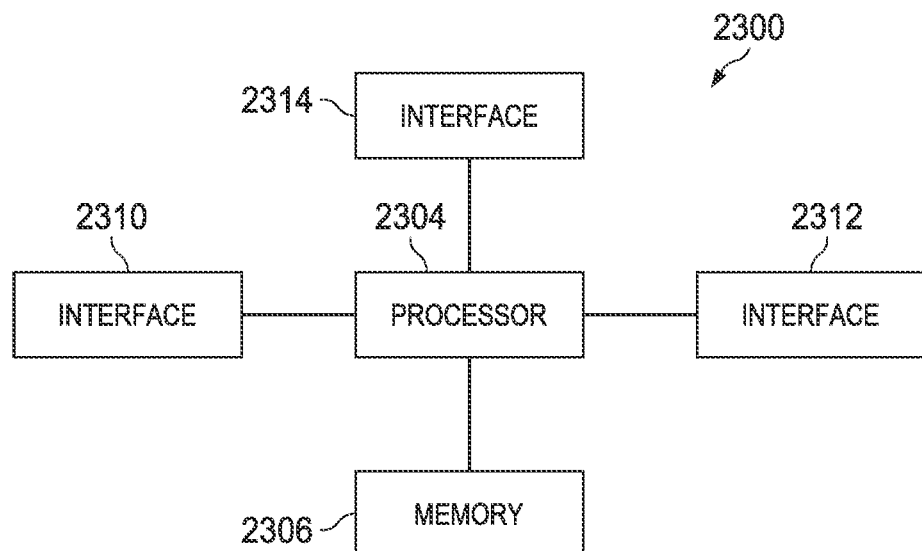
FIG. 23 illustrates a diagram of an embodiment processing system.

FIG. 23 illustrates a block diagram of an embodiment processing system 2300 for performing methods described herein, which may be installed in a host device. As shown, the processing system 2300 includes a processor 2304, a memory 2306, and interfaces 2310-2314, which may (or may not) be arranged as shown in FIG. 23. The processor 2304 may be any component or collection of components adapted to perform computations and/or other processing related tasks, and the memory 2306 may be any component or collection of components adapted to store programming and/or instructions for execution by the processor 2304. In an embodiment, the memory 2306 includes a non-transitory computer readable medium. The interfaces 2310, 2312, 2314 may be any component or collection of components that allow the processing system 2300 to communicate with other devices/components and/or a user. For example, one or more of the interfaces 2310, 2312, 2314 may be adapted to communicate data, control, or management messages from the processor 2304 to applications installed on the host device and/or a remote device. As another example, one or more of the interfaces 2310, 2312, 2314 may be adapted to allow a user or user device (e.g., personal computer (PC), etc.) to interact/communicate with the processing system 2300. The processing system 2300 may include additional components not depicted in FIG. 6, such as long term storage (e.g., non-volatile memory, etc.).

In some embodiments, the processing system 2300 is included in a network device that is accessing, or part otherwise of, a telecommunications network. In one example, the processing system 2300 is in a network-side device in a wireless or wireline telecommunications network, such as a base station, a relay station, a scheduler, a controller, a gateway, a router, an applications server, or any other device in the telecommunications network. In other embodiments, the processing system 2300 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 24:
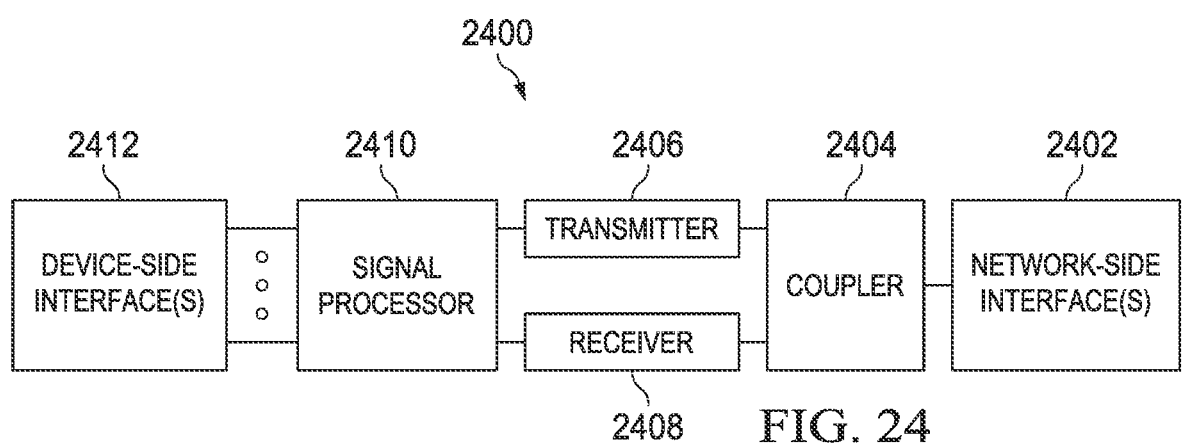
FIG. 24 illustrates a diagram of an embodiment transceiver.

In some embodiments, one or more of the interfaces 2310, 2312, 2314 connects the processing system 2300 to a transceiver adapted to transmit and receive signaling over the telecommunications network. FIG. 24 illustrates a block diagram of a transceiver 2400 adapted to transmit and receive signaling over a telecommunications network. The transceiver 2400 may be installed in a host device. As shown, the transceiver 2400 comprises a network-side interface 2402, a coupler 2404, a transmitter 2406, a receiver 2408, a signal processor 2410, and a device-side interface 2412. The network-side interface 2402 may include any component or collection of components adapted to transmit or receive signaling over a wireless or wireline telecommunications network. The coupler 2404 may include any component or collection of components adapted to facilitate bi-directional communication over the network-side interface 2402. The transmitter 2406 may include any component or collection of components (e.g., up-converter, power amplifier, etc.) adapted to convert a baseband signal into a modulated carrier signal suitable for transmission over the network-side interface 2402. The receiver 2408 may include any component or collection of components (e.g., down-converter, low noise amplifier, etc.) adapted to convert a carrier signal received over the network-side interface 2402 into a baseband signal. The signal processor 2410 may include any component or collection of components adapted to convert a baseband signal into a data signal suitable for communication over the device-side interface(s) 2412, or vice-versa. The device-side interface(s) 2412 may include any component or collection of components adapted to communicate data-signals between the signal processor 2410 and components within the host device (e.g., the processing system 2300, local area network (LAN) ports, etc.).

The transceiver 2400 may transmit and receive signaling over any type of communications medium. In some embodiments, the transceiver 2400 transmits and receives signaling over a wireless medium. For example, the transceiver 2400 may be a wireless transceiver adapted to communicate in accordance with a wireless telecommunications protocol, such as a cellular protocol (e.g., long-term evolution (LTE), etc.), a wireless local area network (WLAN) protocol (e.g., WI-FI, etc.), or any other type of wireless protocol (e.g., BLUETOOTH, near field communication (NFC), etc.). In such embodiments, the network-side interface 2402 comprises one or more antenna/radiating elements. For example, the network-side interface 2402 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2400 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a receiving unit/module, a performing unit/module, a modulating unit/module, or a determining unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method, comprising:
    performing, by a first user equipment (UE) with a network controller, initial access to the network controller on a first subset of contiguous subcarriers of a carrier for communications between the first UE and the network controller, wherein the performing of the initial access comprises:
        receiving, by the first UE from the network controller, a message including configuration information of the first subset of contiguous subcarriers of the carrier; and
        performing, by the first UE, synchronization with the carrier within the first subset of contiguous subcarriers of the carrier and the initial access to the carrier within the first subset of contiguous subcarriers of the carrier; and
    after the performing the initial access to the carrier, transmitting an uplink transmission to the network controller or receiving, by the first UE in the carrier, a downlink transmission from the network controller.

2. The method of claim 1, wherein the message is a radio resource control (RRC) message.

3. The method of claim 1, wherein the carrier is associated with a serving cell of the first UE.

4. The method of claim 1, wherein the transmitting the uplink transmission or the receiving the downlink transmission is within a second subset of contiguous subcarriers of the carrier, and the second subset is the same as or different from the first subset.

5. The method of claim 4, further comprising:
    receiving, by the first UE from the network controller, within the first subset of contiguous subcarriers or the second subset of contiguous subcarriers, at least one of a channel state information-reference signal (CSI-RS), a demodulation reference signal (DMRS) for a physical downlink control channel (PDCCH), or a DMRS for a physical downlink shared channel (PDSCH).

6. A method, comprising:
    transmitting, by a network controller to a first user equipment (UE), a message including configuration information of a first subset of contiguous subcarriers of a carrier, the first subset of contiguous subcarriers of the carrier supporting procedures of synchronization with the carrier and initial access to the carrier with the first UE; and
    after the initial access to the carrier, transmitting a downlink transmission to the UE or receiving, by the network controller in the carrier, an uplink transmission from the UE.

7. The method of claim 6, wherein the message is included in a radio resource control (RRC) signal.

8. The method of claim 6, wherein the carrier is associated with a serving cell of the first UE.

9. The method of claim 6, wherein the transmitting the downlink transmission or the receiving the uplink transmission is within a second subset of contiguous subcarriers of the carrier, and the second subset is the same as or different from the first subset.

10. The method of claim 9, further comprising:
transmitting, by the network controller to the first UE, within the first subset of contiguous subcarriers or the second subset of contiguous subcarriers, at least one of a channel state information-reference signal (CSI-RS), a demodulation reference signal (DMRS) for a physical downlink control channel (PDCCH), or a DMRS for a physical downlink shared channel (PDSCH).

11. A first user equipment (UE), comprising:
at least one processor; and
a non-transitory computer readable storage medium storing programming including instructions that, when executed by the at least one processor, cause the first UE to perform operations including:
performing, with a network controller, initial access to the network controller on a first subset of contiguous subcarriers of a carrier for communications between the first UE and the network controller, the performing of the initial access comprising:
receiving, from the network controller, a message including configuration information of the first subset of contiguous subcarriers of the carrier;
performing synchronization with the carrier within the first subset of contiguous subcarriers of the carrier and the initial access to the carrier within the first subset of contiguous subcarriers of the carrier; and
after the performing the initial access to the network controller, transmitting an uplink transmission to the network controller or receiving in the carrier a downlink transmission from the network controller.

12. The first UE of claim 11, wherein the message is included in a radio resource control (RRC) signal.

13. The first UE of claim 11, wherein the carrier is associated with a serving cell of the first UE.

14. The first UE of claim 11, wherein the transmitting the uplink transmission or the receiving the downlink transmission is within a second subset of contiguous subcarriers of the carrier, and the second subset is the same as or different from the first subset.

15. The first UE of claim 14, the operations further comprising:
receiving, from the network controller, within the first subset of contiguous subcarriers or the second subset of contiguous subcarriers, at least one of a channel state information-reference signal (CSI-RS), a demodulation reference signal (DMRS) for a physical downlink control channel (PDCCH), or a DMRS for a physical downlink shared channel (PDSCH).

16. A network controller, comprising:
at least one processor; and
a non-transitory computer readable storage medium storing programming including instructions that, when executed by the at least one processor, cause the network controller to perform operations including:
transmitting, to a first user equipment (UE), a message including configuration information of a first subset of contiguous subcarriers of a carrier, the first subset of contiguous subcarriers of the carrier supporting procedures of synchronization with the carrier and initial access to the carrier with the first UE; and
after the initial access to the carrier, transmitting a downlink transmission to the UE or receiving in the carrier an uplink transmission from the UE.

17. The network controller of claim 16, wherein the message is included in a radio resource control (RRC) signal.

18. The network controller of claim 16, wherein the carrier is associated with a serving cell of the first UE.

19. The network controller of claim 16, wherein the transmitting the downlink transmission or the receiving the uplink transmission is within a second subset of contiguous subcarriers of the carrier, and the second subset is the same as or different from the first subset.

20. The network controller of claim 19, the operations further comprising:
transmitting, to the first UE, within the first subset of contiguous subcarriers, at least one of a channel state information-reference signal (CSI-RS), a demodulation reference signal (DMRS) for a physical downlink control channel (PDCCH), or a DMRS for a physical downlink shared channel (PDSCH).

* * * * *